United States Patent
Tanaka et al.

(10) Patent No.: US 8,321,722 B2
(45) Date of Patent: Nov. 27, 2012

(54) STORAGE DEVICE, AND DATA PATH FAILOVER METHOD OF INTERNAL NETWORK OF STORAGE CONTROLLER

(75) Inventors: Katsuya Tanaka, Kokubunji (JP); Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/331,205

(22) Filed: Dec. 20, 2011

(65) Prior Publication Data

US 2012/0089864 A1    Apr. 12, 2012

Related U.S. Application Data

(63) Continuation of application No. 12/338,173, filed on Dec. 18, 2008, now Pat. No. 8,082,466.

(30) Foreign Application Priority Data

Oct. 30, 2008  (JP) ................................. 2008-279101

(51) Int. Cl.
*G06F 11/00* (2006.01)
(52) U.S. Cl. ............ 714/6.3; 714/4.11; 714/6.1; 714/43
(58) Field of Classification Search .................. 714/3, 4, 714/5, 4.11, 6.1, 6.3, 43
See application file for complete search history.

(56) References Cited

U.S. PATENT DOCUMENTS

| | | | |
|---|---|---|---|
| 6,606,630 B1 | 8/2003 | Gunlock | |
| 6,715,098 B2 | 3/2004 | Checn et al. | |
| 6,823,477 B1 | 11/2004 | Cheng et al. | |
| 6,888,792 B2 | 5/2005 | Gronke | |
| 6,952,792 B2 | 10/2005 | Emberty et al. | |
| 6,981,174 B1 | 12/2005 | Hanning | |
| 7,003,688 B1 | 2/2006 | Pittelkow et al. | |
| 7,062,594 B1 | 6/2006 | Sardella et al. | |

(Continued)

FOREIGN PATENT DOCUMENTS

JP   2005-332316   12/2005

(Continued)

OTHER PUBLICATIONS

Office Action in JP 2008-279101, mailed May 22, 2012 (2 pgs., in Japanese), English language translation (4 pgs.).

*Primary Examiner* — Joshua P Lottich
(74) *Attorney, Agent, or Firm* — Antonelli, Terry, Stout & Kraus, LLP.

(57) ABSTRACT

A storage device in which the MR-IOV is applied to an internal network of a storage controller. Data path failover can be executed in the storage device. The internal network of the storage controller is configured to enable the access of a virtual function (VF) "VF 0:0, 1" of each endpoint device (ED0-ED2) from a root port RP0. Likewise, "VF 1:0, 1" of each endpoint device can be accessed from a root port RP1. In a first data path from the RP0 to ED0 in a normal state, "VF 0:0, 1" and "MVF 0, 0" are connected by VF mapping. When a failure occurs on the first data path, the MR-PCIM executes the VF migration, whereby in the second data path from the RP1 to ED0, "VF 1:0, 1" and "MVF 0, 0" are connected by VF mapping. As a result, failover to the second data path is realized.

8 Claims, 23 Drawing Sheets

U.S. PATENT DOCUMENTS

| | | |
|---|---|---|
| 7,134,040 B2 | 11/2006 | Ayres |
| 7,257,730 B2 | 8/2007 | Spry |
| 7,330,996 B2 | 2/2008 | Coteus et al. |
| 7,779,308 B2 | 8/2010 | Brown et al. |
| 7,783,818 B1 | 8/2010 | Sardella et al. |
| 7,813,366 B2 * | 10/2010 | Freimuth et al. .............. 370/419 |
| 7,836,332 B2 | 11/2010 | Hara et al. |
| 7,865,654 B2 * | 1/2011 | Pettey et al. .................. 710/311 |
| 2004/0078632 A1 | 4/2004 | Infante et al. |
| 2004/0139365 A1 | 7/2004 | Hosoya |
| 2005/0108476 A1 | 5/2005 | Tanaka et al. |
| 2006/0015770 A1 | 1/2006 | Dicorpo et al. |
| 2006/0200696 A1 | 9/2006 | Shimada |
| 2006/0236028 A1 | 10/2006 | Tanaka et al. |
| 2006/0242353 A1 | 10/2006 | Torudbakken et al. |
| 2006/0253676 A1 | 11/2006 | Tanaka et al. |
| 2007/0016681 A1 | 1/2007 | Suzuki et al. |
| 2008/0082746 A1 | 4/2008 | Nakamura et al. |
| 2008/0147887 A1 | 6/2008 | Freimuth et al. |
| 2008/0148295 A1 | 6/2008 | Freimuth et al. |
| 2008/0162811 A1 | 7/2008 | Steinmetz et al. |
| 2008/0239945 A1 | 10/2008 | Gregg |
| 2009/0248973 A1 | 10/2009 | Deshpande et al. |
| 2009/0276773 A1 | 11/2009 | Brown et al. |
| 2009/0276775 A1 | 11/2009 | Brown et al. |
| 2010/0165874 A1 * | 7/2010 | Brown et al. .................. 370/254 |

FOREIGN PATENT DOCUMENTS

| | | |
|---|---|---|
| JP | 2007-26089 | 2/2007 |
| JP | 2008-084066 | 4/2008 |
| JP | 2008-152786 | 7/2008 |

\* cited by examiner

| Switch Port | PCIM Capable |
|---|---|
| P000, P001 | Yes |
| P010, P011 | |
| P002, P003, P004 | No |
| P012, P013, P014 | |
| P100, P110, P120 | Yes |
| P101, P111, P121 | |
| P102, P112, P122 | No |

| VH | Authorized | VH Mapping | | VF Mapping |
|---|---|---|---|---|
| RP0 | Yes | VS in | SW00, SW10, SW11, SW12 | ED0: 1VFs |
| | | Inter-SW Link | P002 to P100, P003 to P110 P004 to P120 | ED1: 1VFs |
| | | VH in | ED0, ED1, ED2 | ED2: 1VFs |
| RP1 | Yes | VS in | SW01, SW10, SW11, SW12 | ED0: 1VFs |
| | | Inter-SW Link | P012 to P101, P013 to P111 P014 to P121 | ED1: 1VFs |
| | | VH in | ED0, ED1, ED2 | ED2: 1VFs |
| RP2 | Yes | VS in | SW00, SW10, SW11, SW12 | ED0: 1VFs |
| | | Inter-SW Link | P002 to P100, P003 to P110 P004 to P120 | ED1: 1VFs |
| | | VH in | ED0, ED1, ED2 | ED2: 1VFs |
| RP3 | Yes | VS in | SW01, SW10, SW11, SW12 | ED0: 1VFs |
| | | Inter-SW Link | P012 to P101, P013 to P111 P014 to P121 | ED1: 1VFs |
| | | VH in | ED0, ED1, ED2 | ED2: 1VFs |

| Slot | Root | VS | Bridge | Enable | Mapped | Port | Port VHN | |
|---|---|---|---|---|---|---|---|---|
| 0 | RP0 | VS0 | Upstream | Yes | Yes | P000 | VH 0 | —601 |
| 1 | RP0 | VS0 | Downstream 0 | Yes | Yes | P002 | VH 0 | |
| 2 | RP0 | VS0 | Downstream 1 | Yes | Yes | P003 | VH 0 | 602 |
| 3 | RP0 | VS0 | Downstream 2 | Yes | Yes | P004 | VH 0 | |
| 4 | | VS0 | Downstream 3 | No | No | | | |
| 5 | | VS0 | Downstream 4 | No | No | | | |
| 6 | | VS0 | Downstream 5 | No | No | | | |
| 7 | | VS0 | Downstream 6 | No | No | | | |
| 8 | | VS0 | Downstream 7 | No | No | | | |
| 9 | RP2 | VS1 | Upstream | Yes | Yes | P001 | VH 0 | —603 |
| 10 | RP2 | VS1 | Downstream 0 | Yes | Yes | P002 | VH 1 | |
| 11 | RP2 | VS1 | Downstream 1 | Yes | Yes | P002 | VH 1 | 604 |
| 12 | RP2 | VS1 | Downstream 2 | Yes | Yes | P004 | VH 1 | |
| 13 | | VS1 | Downstream 3 | No | No | | | |
| 14 | | VS1 | Downstream 4 | No | No | | | |
| 15 | | VS1 | Downstream 5 | No | No | | | |
| 16 | | VS1 | Downstream 6 | No | No | | | |
| 17 | | VS1 | Downstream 7 | No | No | | | |

Columns: a=Slot, b=Root, c=VS, d=Bridge, e=Enable, f=Mapped, g=Port, h=Port VHN

| | a | b | c | d | e | f | g | h | |
|---|---|---|---|---|---|---|---|---|---|
| | Slot | Root | VS | Bridge | Enable | Mapped | Port | Port VHN | |
| | 0 | RP1 | VS0 | Upstream | Yes | Yes | P010 | VH 0 | —701 |
| | 1 | RP1 | VS0 | Downstream 0 | Yes | Yes | P012 | VH 0 | |
| | 2 | RP1 | VS0 | Downstream 1 | Yes | Yes | P013 | VH 0 | }702 |
| | 3 | RP1 | VS0 | Downstream 2 | Yes | Yes | P014 | VH 0 | |
| | 4 | | VS0 | Downstream 3 | No | No | | | |
| | 5 | | VS0 | Downstream 4 | No | No | | | |
| | 6 | | VS0 | Downstream 5 | No | No | | | |
| | 7 | | VS0 | Downstream 6 | No | No | | | |
| | 8 | | VS0 | Downstream 7 | No | No | | | |
| | 9 | RP3 | VS1 | Upstream | Yes | Yes | P011 | VH 0 | —703 |
| | 10 | RP3 | VS1 | Downstream 0 | Yes | Yes | P012 | VH 1 | |
| | 11 | RP3 | VS1 | Downstream 1 | Yes | Yes | P013 | VH 1 | }704 |
| | 12 | RP3 | VS1 | Downstream 2 | Yes | Yes | P014 | VH 1 | |
| | 13 | | VS1 | Downstream 3 | No | No | | | |
| | 14 | | VS1 | Downstream 4 | No | No | | | |
| | 15 | | VS1 | Downstream 5 | No | No | | | |
| | 16 | | VS1 | Downstream 6 | No | No | | | |
| | 17 | | VS1 | Downstream 7 | No | No | | | |

| Slot (a) | Root (b) | VS (c) | Bridge (d) | Enable (e) | Mapped (f) | Port (g) | Port VHN (h) | |
|---|---|---|---|---|---|---|---|---|
| 0 | RP0 | VS0 | Upstream | Yes | Yes | P0100 | VH 0 | |
| 1 | RP0 | VS0 | Downstream 0 | Yes | Yes | P0102 | VH 0 | 801 |
| 2 |  | VS0 | Downstream 1 | No | No |  |  | |
| 3 | RP1 | VS1 | Upstream | Yes | Yes | P0101 | VH 0 | |
| 4 | RP1 | VS1 | Downstream 0 | Yes | Yes | P0102 | VH 1 | 802 |
| 5 |  | VS1 | Downstream 1 | No | No |  |  | |
| 6 | RP2 | VS2 | Upstream | Yes | Yes | P0100 | VH 1 | |
| 7 | RP2 | VS2 | Downstream 0 | Yes | Yes | P0102 | VH 2 | 803 |
| 8 |  | VS2 | Downstream 1 | No | No |  |  | |
| 9 | RP3 | VS3 | Upstream | Yes | Yes | P0101 | VH 1 | |
| 10 | RP3 | VS3 | Downstream 0 | Yes | Yes | P0102 | VH 3 | 804 |
| 11 |  | VS3 | Downstream 1 | No | No |  |  | |

| Slot (a) | Root (b) | VS (c) | Bridge (d) | Enable (e) | Mapped (f) | Port (g) | Port VHN (h) | |
|---|---|---|---|---|---|---|---|---|
| 0 | RP0 | VS0 | Upstream | Yes | Yes | P0110 | VH 0 | |
| 1 | RP0 | VS0 | Downstream 0 | Yes | Yes | P0112 | VH 0 | 901 |
| 2 |  | VS0 | Downstream 1 | No | No |  |  | |
| 3 | RP1 | VS1 | Upstream | Yes | Yes | P0111 | VH 0 | |
| 4 | RP1 | VS1 | Downstream 0 | Yes | Yes | P0112 | VH 1 | 902 |
| 5 |  | VS1 | Downstream 1 | No | No |  |  | |
| 6 | RP2 | VS2 | Upstream | Yes | Yes | P0110 | VH 1 | |
| 7 | RP2 | VS2 | Downstream 0 | Yes | Yes | P0112 | VH 2 | 903 |
| 8 |  | VS2 | Downstream 1 | No | No |  |  | |
| 9 | RP3 | VS3 | Upstream | Yes | Yes | P0111 | VH 1 | |
| 10 | RP3 | VS3 | Downstream 0 | Yes | Yes | P0112 | VH 3 | 904 |
| 11 |  | VS3 | Downstream 1 | No | No |  |  | |

| | a | b | c | d | e | f | g | h | |
|---|---|---|---|---|---|---|---|---|---|
| | Slot | Root | VS | Bridge | Enable | Mapped | Port | Port VHN | |
| | 0 | RP0 | VS0 | Upstream | Yes | Yes | P0120 | VH 0 | |
| | 1 | RP0 | VS0 | Downstream 0 | Yes | Yes | P0122 | VH 0 | ~1001 |
| | 2 | | VS0 | Downstream 1 | No | No | | | |
| | 3 | RP1 | VS1 | Upstream | Yes | Yes | P0121 | VH 0 | |
| | 4 | RP1 | VS1 | Downstream 0 | Yes | Yes | P0122 | VH 1 | ~1002 |
| | 5 | | VS1 | Downstream 1 | No | No | | | |
| | 6 | RP2 | VS2 | Upstream | Yes | Yes | P0120 | VH 1 | |
| | 7 | RP2 | VS2 | Downstream 0 | Yes | Yes | P0122 | VH 2 | ~1003 |
| | 8 | | VS2 | Downstream 1 | No | No | | | |
| | 9 | RP3 | VS3 | Upstream | Yes | Yes | P0121 | VH 1 | |
| | 10 | RP3 | VS3 | Downstream 0 | Yes | Yes | P0122 | VH 3 | ~1004 |
| | 11 | | VS3 | Downstream 1 | No | No | | | |

| a | b | c | d | | e | |
|---|---|---|---|---|---|---|
| PF | LVF # | VF State | VF | | MVF | |
| PF 0:0 | LVF 0, 0 | A.A | VF 0:0, 1 | → | MVF 0, 0 | ~1101 |
| PF 1:0 | LVF 0, 1 | I.U | VF 1:0, 1 | → | None | ~1102 |
| PF 2:0 | LVF 0, 2 | A.A | VF 2:0, 1 | → | MVF 0, 1 | ~1103 |
| PF 3:0 | LVF 0, 3 | I.U | VF 3:0, 1 | → | None | ~1104 |

| PF (a) | LVF # (b) | VF State (c) | VF (d) | | MVF (e) | |
|---|---|---|---|---|---|---|
| PF 0:0 | LVF 0, 0 | A.A | VF 0:0, 1 | → | MVF 0, 0 | ~1201 |
| PF 1:0 | LVF 0, 1 | A.A | VF 1:0, 1 | → | MVF 0, 1 | ~1202 |
| PF 2:0 | LVF 0, 2 | A.A | VF 2:0, 1 | → | MVF 0, 2 | ~1203 |
| PF 3:0 | LVF 0, 3 | A.A | VF 3:0, 1 | → | MVF 0, 3 | ~1204 |

| PF (a) | LVF # (b) | VF State (c) | VF (d) | | MVF (e) | |
|---|---|---|---|---|---|---|
| PF 0:0 | LVF 0, 0 | I.U | VF 0:0, 1 | → | None | ~1301 |
| PF 1:0 | LVF 0, 1 | A.A | VF 1:0, 1 | → | MVF 0, 0 | ~1302 |
| PF 2:0 | LVF 0, 2 | I.U | VF 2:0, 1 | → | None | ~1303 |
| PF 3:0 | LVF 0, 3 | A.A | VF 3:0, 1 | → | MVF 0, 1 | ~1304 |

FIG. 15

| DATA PATH IN NORMAL STATE (A) | | | | ALTERNATIVE DATA PATH (B) | | | | VF Migration (C) | INVOLVED DATA PATH (FIRST-STAGE LINK FAILURE) (D) | | | INVOLVED DATA PATH (SECOND-STAGE LINK FAILURE) (E) | | |
|---|---|---|---|---|---|---|---|---|---|---|---|---|---|---|
| S | Root | ED | VF | S | Root | ED | VF | | Root | ED | VF | Root | ED | VF |
| E | RP0 | ED0 | VF 0:0,1 | D | RP1 | ED0 | VF 1:0,1 | yes | RP0<br>RP0 | ED1<br>ED2 | VF 0:0,1<br>VF 0:0,1 | RP2 | ED0 | VF 2:0,1 |
| E | RP0 | ED1 | VF 0:0,1 | | | | | no | RP0<br>RP0 | ED0<br>ED2 | VF 0:0,1<br>VF 0:0,1 | RP2 | ED1 | VF 2:0,1 |
| D | RP0 | ED2 | VF 0:0,1 | E | RP1 | ED2 | VF 1:0,1 | yes | RP0<br>RP0 | ED0<br>ED1 | VF 0:0,1<br>VF 0:0,1 | RP2 | ED2 | VF 2:0,1 |
| D | RP1 | ED0 | VF 1:0,1 | E | RP0 | ED0 | VF 0:0,1 | yes | RP1<br>RP1 | ED1<br>ED2 | VF 1:0,1<br>VF 1:0,1 | RP3 | ED0 | VF 3:0,1 |
| E | RP1 | ED1 | VF 1:0,1 | | | | | no | RP1<br>RP1 | ED0<br>ED2 | VF 1:0,1<br>VF 1:0,1 | RP3 | ED1 | VF 3:0,1 |
| E | RP1 | ED2 | VF 1:0,1 | D | RP0 | ED2 | VF 0:0,1 | yes | RP1<br>RP1 | ED0<br>ED1 | VF 1:0,1<br>VF 1:0,1 | RP3 | ED2 | VF 3:0,1 |
| E | RP2 | ED0 | VF 2:0,1 | D | RP3 | ED0 | VF 3:0,1 | yes | RP2<br>RP2 | ED1<br>ED2 | VF 2:0,1<br>VF 2:0,1 | RP0 | ED0 | VF 0:0,1 |
| D | RP2 | ED1 | VF 2:0,1 | | | | | no | RP2<br>RP2 | ED0<br>ED2 | VF 2:0,1<br>VF 2:0,1 | RP0 | ED1 | VF 0:0,1 |
| D | RP2 | ED2 | VF 2:0,1 | E | RP3 | ED2 | VF 3:0,1 | yes | RP2<br>RP2 | ED0<br>ED1 | VF 2:0,1<br>VF 2:0,1 | RP0 | ED2 | VF 0:0,1 |
| D | RP3 | ED0 | VF 3:0,1 | E | RP2 | ED0 | VF 2:0,1 | yes | RP3<br>RP3 | ED1<br>ED2 | VF 3:0,1<br>VF 3:0,1 | RP1 | ED0 | VF 1:0,1 |
| E | RP3 | ED1 | VF 3:0,1 | | | | | no | RP3<br>RP3 | ED0<br>ED2 | VF 3:0,1<br>VF 3:0,1 | RP1 | ED1 | VF 1:0,1 |
| E | RP3 | ED2 | VF 3:0,1 | D | RP2 | ED2 | VF 2:0,1 | yes | RP3<br>RP3 | ED0<br>ED1 | VF 3:0,1<br>VF 3:0,1 | RP1 | ED2 | VF 1:0,1 |

| PF | LVF # | VF State | VF | | MVF |
|---|---|---|---|---|---|
| PF 0:0 | LVF 0, 0 | A.A | VF 0:0, 1 | → | MVF 0, 0 |
| PF 1:0 | LVF 0, 1 | I.U | VF 1:0, 1 | → | None |
| PF 2:0 | LVF 0, 2 | I.U | VF 2:0, 1 | → | None — 1901 |
| PF 3:0 | LVF 0, 3 | A.A | VF 3:0, 1 | → | MVF 0, 1 — 1902 | a, b, c, d, e

| PF | LVF # | VF State | VF | | MVF |
|---|---|---|---|---|---|
| PF 0:0 | LVF 0, 0 | I.U | VF 0:0, 1 | → | None |
| PF 1:0 | LVF 0, 1 | A.A | VF 1:0, 1 | → | MVF 0, 0 |
| PF 2:0 | LVF 0, 2 | A.A | VF 2:0, 1 | → | MVF 0, 1 — 2001 |
| PF 3:0 | LVF 0, 3 | I.U | VF 3:0, 1 | → | None — 2002 | a, b, c, d, e

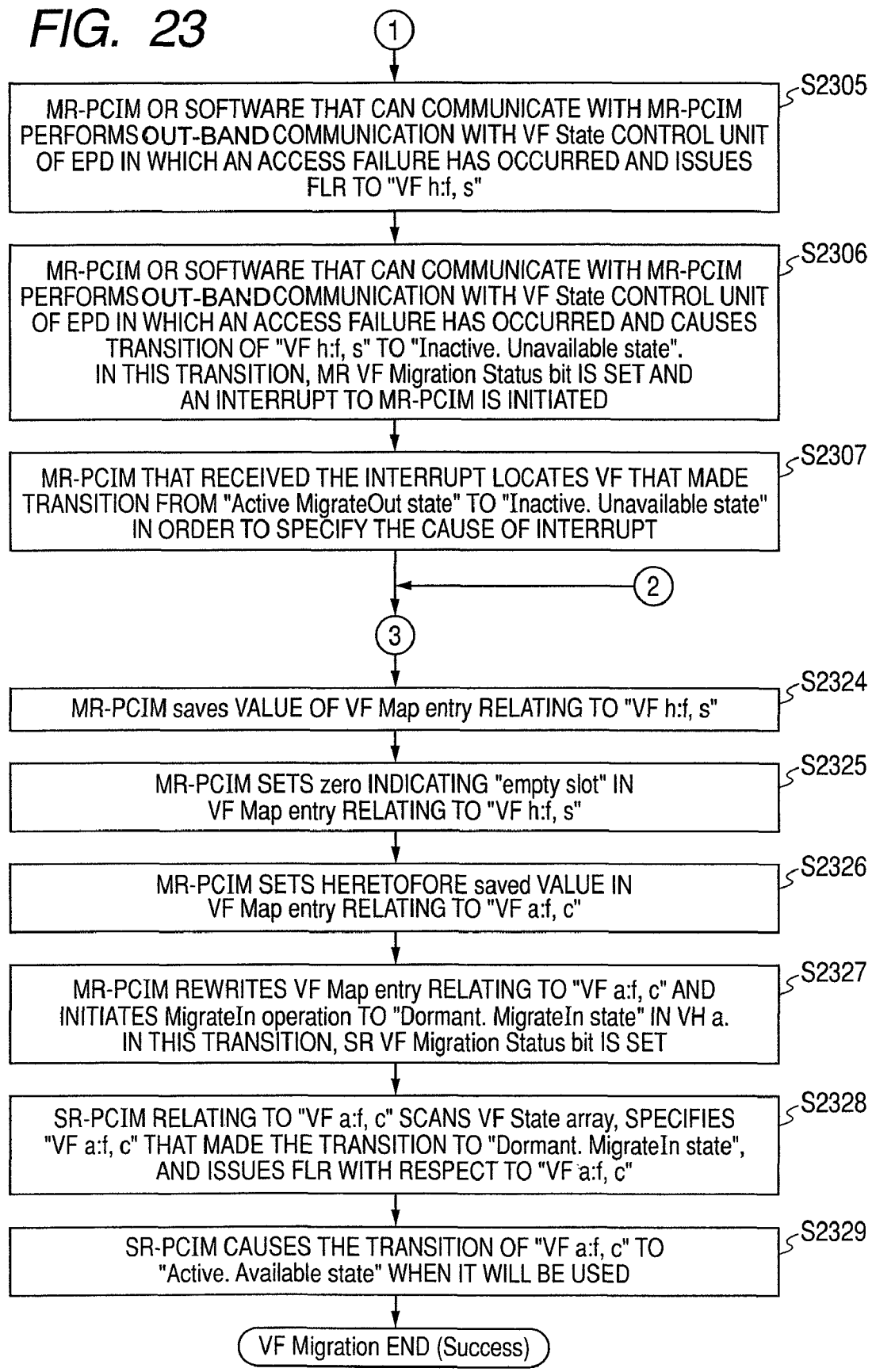

STORAGE DEVICE, AND DATA PATH FAILOVER METHOD OF INTERNAL NETWORK OF STORAGE CONTROLLER

CROSS REFERENCES TO RELATED APPLICATIONS

This application is a continuation of U.S. application Ser. No. 12/338,173, filed Dec. 18, 2008 now U.S. Pat. No. 8,082,466 and which application relates to and claims priority from Japanese Patent Application No. 2008-279101, filed on Oct. 30, 2008, the entire disclosure of which is incorporated herein by reference.

BACKGROUND OF THE INVENTION

1. Field of the Invention

The present invention relates to a storage device (also referred to as a disk array device), and more particularly to failover technology of data path of an internal network of a storage controller.

2. Description of the Related Art

A storage device is typically provided with a storage controller (also referred to simply as a controller) and a random-accessible nonvolatile medium. The medium is, for example, a disk array including a large number of hard disk drives (HDD). The storage controller has a front-end interface (abbreviated as FEI/F) for connecting a host device (host system and the like), a back-end interface (abbreviated as BEI/F) for connecting a disk array, and a cache memory (abbreviated as CM) that temporarily stores data that the host device will write into the disk array and read therefrom. In addition, the storage controller includes a processor for controlling data transfer between the host device and cache memory and between the disk array and cache memory.

In a storage device requiring high reliability, a network in which the processor, FEI/F, BEI/F, and CM located in the storage controller are connected to each other is configured to enable failover when a data path failure occurs. Furthermore, in a storage device requiring high performance, a plurality of processors are connected to an internal network (abbreviated as CN) of a storage controller to control data transfer.

Well-known technology relating to a storage system equipped with an internal network (CN) enabling the failover when a data path failure occurs is described in Japanese Patent Application Published No. 2008-84066.

Furthermore, PCI Express (abbreviated as PCIe) is known as a standardized specification (base specification) relating to a network connecting the processor and FEI/F or BEI/F or the like. A "Multi-Root I/O Virtualization and Sharing Specification" (referred to hereinbelow as MR-IOV) for sharing an I/O device among a plurality of processors has also been standardized. Because, the MR-IOV is a standard, components such as switches that conform to the MR-IOV appear to be commoditized.

In other words, where an internal network (CN) of a storage controller is configured using the MR-IOV, which is a standard, the cost of the storage controller can be expected to be reduced.

"Single-Root I/O Virtualization and Sharing Specification" (referred to hereinbelow as SR-IOV) is also well known. In the SR-IOV, a plurality of SIs (System Image) can be accessed from one root port (abbreviated hereinbelow as RP) to a plurality of endpoint devices (abbreviated hereinbelow as EPDs). In the MR-IOV, a tree-like topology in which endpoints are viewed from one RP is called "virtual hierarchy" (referred to hereinbelow as VH). In the MR-IOV, a plurality of VHs are configured within the network, and one or more SIs can access a plurality of EPDs from one RP in each VH.

SUMMARY OF THE INVENTION

In the present MR-IOV specification, no failover (switching from a failed path to an alternative path) is considered for a data path in the case a failure has occurred in the data path between the RP and endpoint (EPD) and no specific method for such failover is defined.

The resultant problem is that no data path failover can be executed in a storage device in which the MR-IOV is applied to an internal network (CN) of a storage controller.

The present invention was created to resolve this problem and it is an object thereof to provide a feature enabling the execution of data path failover in relation to a storage device in which the MR-IOV is applied to an internal network (CN) of a storage controller.

The invention disclosed in the present application can be summarized as follows. In order to attain the aforementioned object, the representative aspect of the present invention resides in a storage device (or system) having an internal network (CN) in which components located within a storage controller (SC) are connected by PCI Express (PCIe). Features of the storage device are described below.

The storage controller (SC) of the storage device and the internal network (CN) thereof, for example, have one or more root complexes (RCs) that have a plurality of RPs as a whole, each root complex having one or more (in particular, a plurality of) RPs; one or more processors connected to each RC; a plurality of EPDs that are MRA (Multi-Root Aware) devices provided with predetermined interfaces (mission virtual function (MVF)) and having a plurality of virtual functions (VFs) that can be accessed from each of the plurality of (all) RPs; and a switch that is an MRA switch that connects the plurality of RPs and the plurality of EPDs, configures data paths, and has a plurality of ports. At least one of the plurality of EPDs can execute (provided with a VF migration function) VF migration of changing (migrating) a mapping (association) of the VF and the predetermined interfaces. Further, in the SC and CN, the switch and the EPDs are so set that all of the plurality of RPs can access the VFs located within all of the plurality of EPDs. When a failure occurs in one data path from one of the plurality of RPs to one of the plurality of EPDs via the switch, the SC and CN perform a processing of switching (first switching) an access source RP of the data path and a processing of switching (second switching) a mapping of a VF of the access target EPD to the predetermined interface by the VF migration in switching from a first data path in a failure state to an alternative second data path, as a processing for executing data path failover.

In the present storage device, components located within the storage controller (SC) are connected, for example, by an MRA switch of PCIe. The MRA device (MRA switch) is a device conforming to MR-IOV. The RC has one or more (in particular, a plurality of) RPs. A data path by which the VFs located in the EPDs are accessed from an RP in the RC via the switch is configured, and predetermined interfaces (functions) are mapped as MVFs to the VFs in the EPDs. Functions such as a front-end interface (FEI/F) and a back-end interface (BEI/F) are configured by the below-described MRA devices (EPD). Thus, a MRA device that has a VF accessible from each RP in the SC and can execute VF migration is used as the MRA device (EPD).

Further, the internal network (CN) of the storage controller has a first EPD having the FEI/F and a second EPD having the BEI/F as EPD that are MRA devices. The first EPD and second EPD have a plurality of VFs accessible from each (a plurality of) RPs in the SC, in other words, have VF resources that can be accessed at least in VH (a plurality of) segments. Further, the EPDs are set in advance to enable the execution of VF migration (for example, have a register or the like that sets an enable/disable bit of VF migration function and are set to enable).

A cache memory interface (CMI/F) is configured by an MRA device having a VF accessible from each RP within the SC. The internal network (CN) of the storage controller has a third EPD having a CMI/F as an EPD that is an MRA device. The third EPD has a plurality of VFs accessible from each (a plurality of) RPs within the SC.

The MRA switch and MRA devices are set so that all the RPs within the SC can access the VF within each MRA device (EPD) such as the FEI/F (first EPD), or BEI/F (second EPD), or CMI/F (third EPD).

When a failure occurs in a data path from a RP within the SC to the EPD functions, the MR-PCIM or the like performs switching of the access source RP of the data path and switching of the mapping of the VF within the access target MRA device to the MVF by VF migration, thereby executing the data path failover.

In the present configuration, resources (VFs) accessible by each RP are held in each EPD. For example, each of a plurality of EPDs has four VFs for four RPs. The VF is a presence that is displayed virtually at the CPU (processor), and the MVF is an entity of a function. The association (mapping) of VF with MVF is based on the MR-IOV specification.

As demonstrated by the above-described configuration, the first feature is that mapping of the access target VF-MVF is changed by VF migration during failover, rather than only by changing the access source RP.

The second feature is that alternative means other than that based on SR-PCIM is provided as a countermeasure to be employed when a data path failure occurs with respect to the VF migration control means. The function of such alternative means is imparted to the EPD. For example, there are the first method (method based on in-band communication), second method (method based on out-band communication), and third method (method based on an autonomous function).

The effects that can be obtained with representative embodiments of the invention disclosed in the present application will be described below in a simple manner. The representative embodiment of the present invention relates to a storage device in which the MR-IOV is applied to an internal network of a storage controller and a data path failover can be executed even when a failure occurs in a data path from the RP to the EPD in the storage controller (internal network). Therefore, high reliability can be ensured because the failover can be performed to other data paths.

BRIEF DESCRIPTION OF THE DRAWINGS

FIG. 4 is an explanatory drawing of a switch port type management table in Embodiment 1;

FIG. 5 is an explanatory drawing of a VH and VF mapping policy management table in Embodiment 1;

FIG. 6 is an explanatory drawing of a switch (SW00) management table in Embodiment 1;

FIG. 7 is an explanatory drawing of a switch (SW01) management table in Embodiment 1;

FIG. 8 is an explanatory drawing of a switch (SW10) management table in Embodiment 1;

FIG. 9 is an explanatory drawing of a switch (SW11) management table in Embodiment 1;

FIG. 10 is an explanatory drawing of a switch (SW12) management table in Embodiment 1;

FIG. 11 is an explanatory drawing of a VF mapping management table of ED0 in Embodiment 1;

FIG. 12 is an explanatory drawing of a VF mapping management table of ED1 in Embodiment 1;

FIG. 13 is an explanatory drawing of a VF mapping management table of ED2 in Embodiment 1;

FIG. 15 is an explanatory drawing of a failover management table in Embodiment 1;

FIG. 19 is an explanatory drawing of a VF mapping management table (second table) of ED0 in Embodiment 1;

FIG. 20 is an explanatory drawing of a VF mapping management table (second table) of ED2 in Embodiment 1;

FIG. 23 is a flowchart illustrating a VF migration processing in the second method in Embodiment 2;

DESCRIPTION OF THE PREFERRED EMBODIMENTS

The embodiments of the present invention will be described below in greater detail with reference to the appended drawings. In all the drawings illustrating the embodiments, line components are in principle assigned with like reference symbols and redundant explanation thereof is omitted.

Embodiment 1

Figure 16:
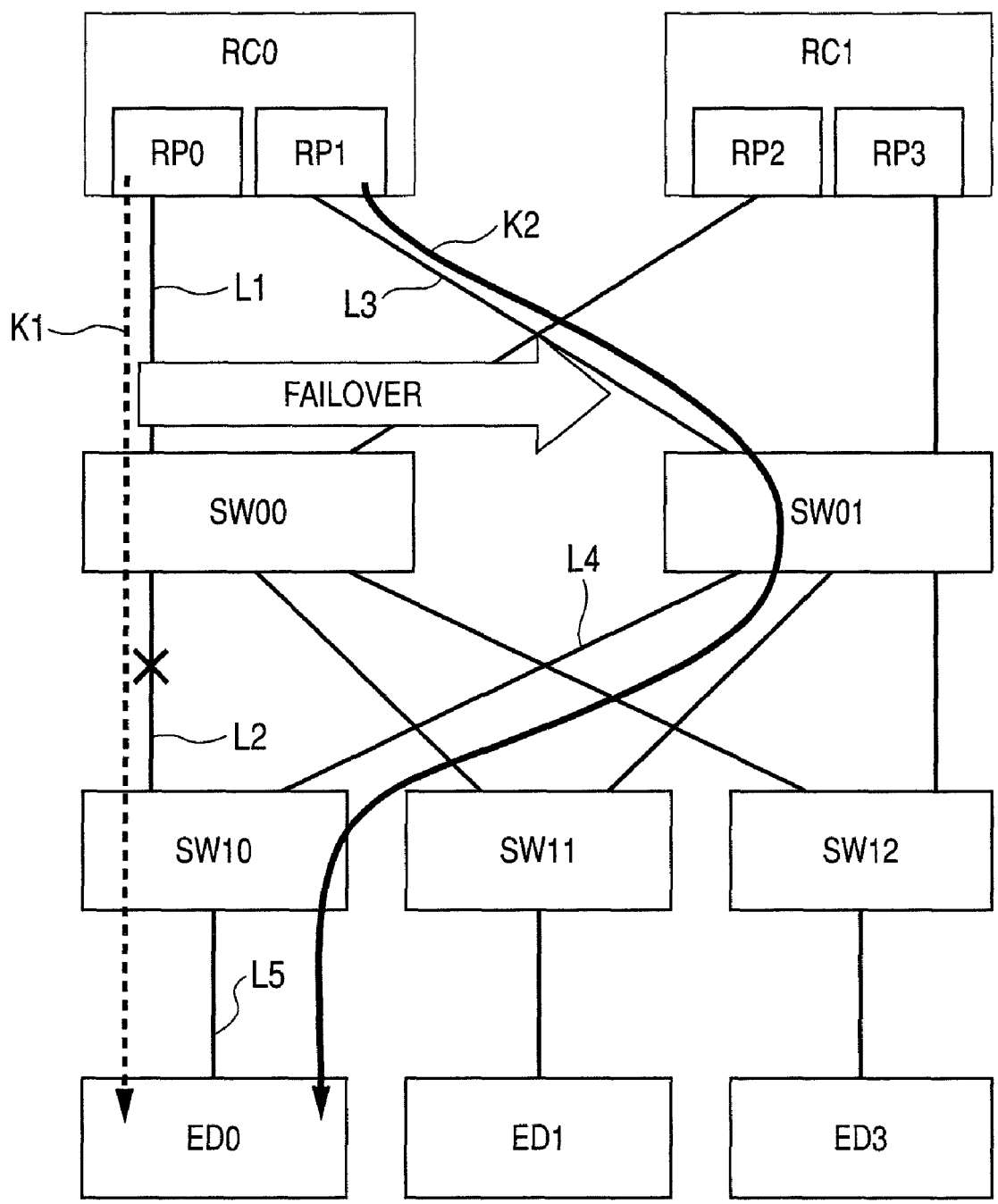
FIG. 16 is an explanatory drawing of a failover operation (switching to an alternative data path) in Embodiment 1.
Figure 17:
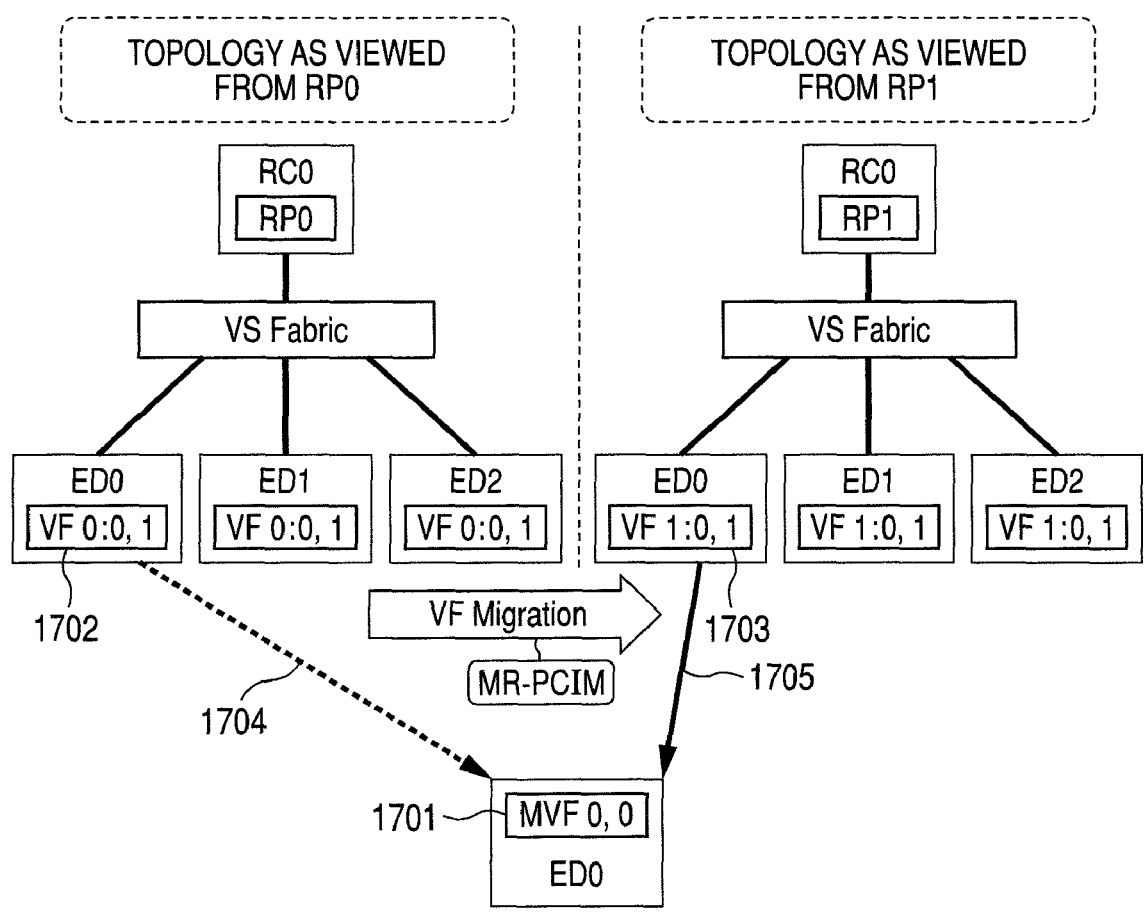
FIG. 17 is an explanatory drawing of a failover operation (VF migration) in Embodiment 1.

A storage device (in other words, a storage system) of Embodiment 1 of the present invention will be described below with reference to FIGS. 1-20. Summarizing Embodiment 1, as shown in FIGS. 16, 17, and the like, on the basis of the configuration shown in FIGS. 1, 2, and the like, in an internal network of a storage controller, the failover operation from a normal data path (failure state) to an alternative data path is realized by changing a root port of an access source (for example, RP0→RP1) and also changing the mapping (VF mapping) of a virtual function (VF) of an endpoint device to a mission virtual function (MVF) as a control of VF migration (for example, "VF 0:0, 1"→"MVF 0:0"→"VF 1:0, 1"→"MVF 0:0" of the ED0).

<Storage Device>

Figure 1:
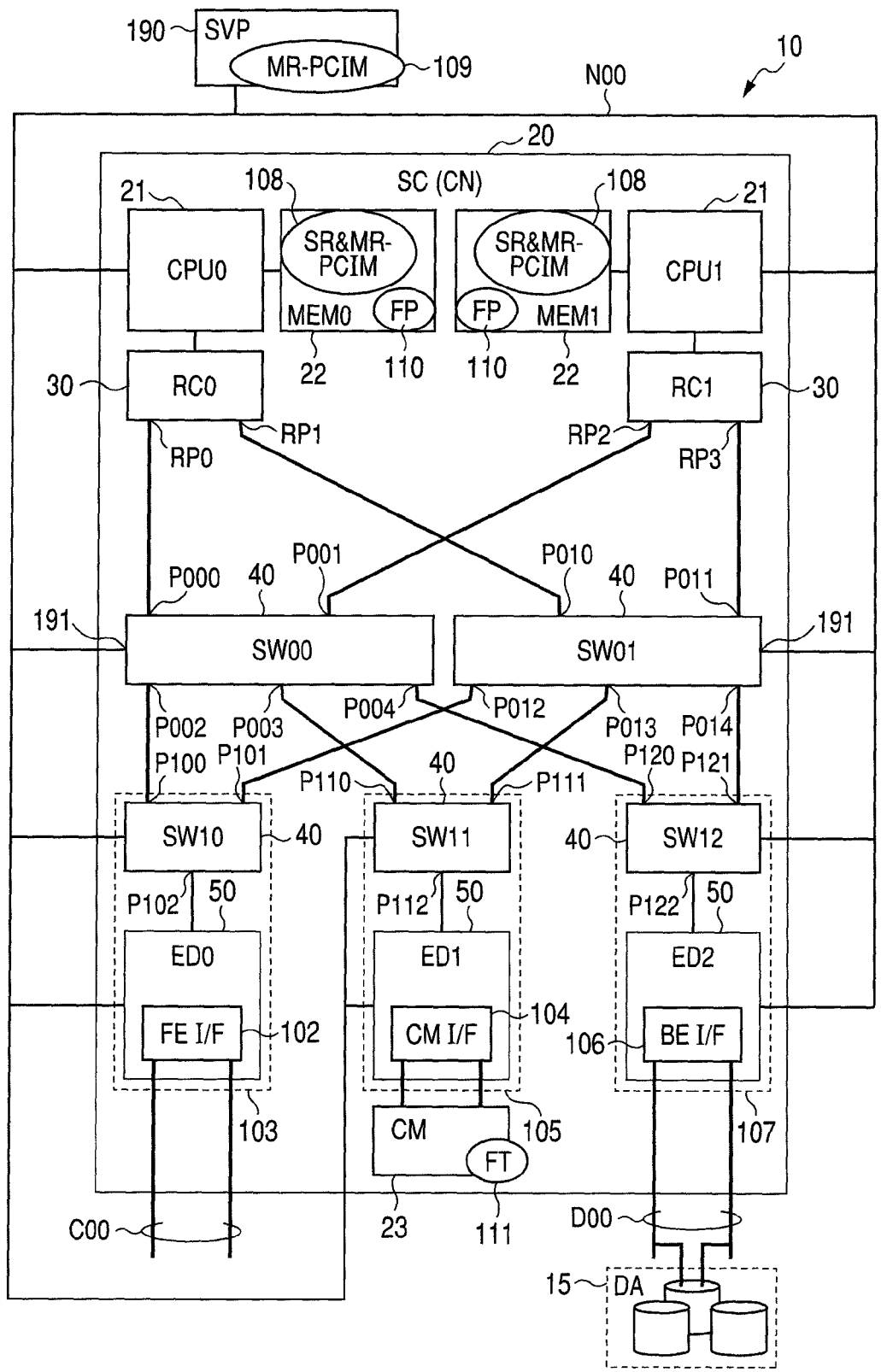
FIG. 1 shows a block configuration of a storage device of Embodiment 1 of the present invention.

FIG. 1 is a block diagram of a storage device 10, which is an embodiment of the present invention. The storage device 10 is provided with a storage controller (SC) 20 and a disk array (DA) 15. The DA 15 is configured by a plurality of memory devices such as hard disk drives (HDD) or solid state drives. An external host device (host system) or the like is connected to SC 20 via a channel C00. Further, a maintenance terminal (denoted by SVP) 190 is connected via a network N00 to the SC 20.

The storage controller (SC) 20 and the internal network (CN) thereof are configured by two processors 21 (CPU0, CPU1), two memory units 22 (MEM0, MEM1), two root complexes (RC) 30 (RC0, RC1), three endpoint devices (EPD) 50 (ED0, ED1, ED2), one cache memory (CM) 23, and a plurality (five) of switches 40 (SW00, SW01, SW10, SW11, SW12). The internal network (CN) is configured by mutual connection (PCIe fabric) of the above-described components via the switches.

In the SC 20 and CN configuration, the processor 21 and memory 22 are at least duplicated and those denoted by identical reference numerals are arranged with left-right symmetry. Further, the number of components (switches and the like) constituting the SC 20 (and CN) is not limited to that in the configuration example shown in FIG. 1. For example, the number of RC 30, SW 40, or EPD 50 may be increased.

The CPU0 (CPU1), which is the processor 21, performs processing of various types by executing a program stored in the MEM0 (MEM1), which is the memory 22. More specifically, the CPU0 (CPU1) controls data transfer between the host device (host system) connected to the SC 20 and the DA 15. The MEM0 (MEM1), which is the memory 22, stores the program that is executed by the CPU0 (CPU1), which is the processor 21, and data or the like of reference tables.

In the present example, a program 108 of both a single-root PCI manager (SR-PCIM) and a multi-root PCI manager (MR-PCIM), a failover control program (FP) 110, and tables of management information of various types (described below) are stored in memory units 22. Further, tables of management information of various types including a failover control table (FT) 111 are also stored in a partial region of the CM 23. The table or program such as the program 109 of the MR-PCIM is also stored in the maintenance terminal (SVP) 190.

Information of each table can be set or changed by an administrator. The administrator, for example, operates the maintenance terminal (SVP) 190 and enables the operation of the maintenance-administration system including the aforementioned setting and the like. In this case, the administrator inputs the information relating to table setting or the like to the SVP 190. The SVP 190 sends the inputted information to the processor 21 (CPU0 (CPU1)) via the network N00. The processor 21 creates or changes the object table on the basis of the received information. The processor 21 then stores the table in the memory 22 (MEM0 (MEM1)).

The first root complex 30 (RC0) is connected to the first processor 21 (CPU0) and provided with RP0, RP1, which are two root ports (first RP, second RP) of the PCIe base specification. Likewise, the second root complex 30 (RC1) is connected to the second processor 21 (CPU1) and provided with RP2, RP3, which are two root ports (first RP, second RP) of the PCIe base specification.

The first root port (RP0) is connected to the first endpoint device 50 (ED0) via the first switch 40 (SW00) and third switch 40 (SW10). Further, the RP0 is connected to the third endpoint device 50 (ED1) via the SW00 and fourth switch 40 (SW11). The RP0 is connected to the second endpoint device 50 (ED2) via the SW00 and the fifth switch 40 (SW12).

The second root port (RP1) is connected to the first endpoint device 50 (ED0) via the second switch 40 (SW01) and third switch 40 (SW10). Further, the RP1 is connected to the third endpoint device 50 (ED1) via the SW01 and the fourth switch 40 (SW11). The RP1 is connected to the second endpoint device 50 (ED2) via the SW01 and the fifth switch 40 (SW12).

The third root port (RP2) (first RP within the RC1) is connected to the first endpoint device 50 (ED0) via the first switch 40 (SW00) and third switch 40 (SW10). Further, the RP2 is connected to the third endpoint device 50 (ED1) via the SW00 and the fourth switch 40 (SW11). The RP2 is connected to the second endpoint device 50 (ED2) via the SW00 and the fifth switch 40 (SW12).

The fourth root port (RP3) (second RP within the RC1) is connected to the first endpoint device 50 (ED0) via the second switch 40 (SW01) and third switch 40 (SW10). Further, the RP3 is connected to the third endpoint device 50 (ED1) via the SW01 and the fourth switch 40 (SW11). The RP3 is connected to the second endpoint device 40 (ED2) via the SW01 and the fifth switch 40 (SW12).

The switches (SW00, SW01, SW10, SW11, SW12) are multi-root aware (MRA) switches conforming to the MR-IOV specification. The endpoint devices 50 (ED0, ED1, ED2) are MRA devices. The first and second switches (SW00, SW01) are connected to the RC 30 side. The third to fifth switches (SW10, SW11, SW12) are connected to the EPD 50 side.

The first switch 40 (SW00) is provided with ports P000, P001, P002, P003, P004 for configuring a data path and also a management port 191 that can be connected to the network N00. Likewise, the second switch 40 (SW01) is provided with ports P010, P011, P012, P013, P014 and a management port 191. By, connecting the SVP 190 to the management port 191 of the switch 40 via the network N00, the administrator can set and manage the PCIe fabric.

The third switch 40 (SW10) is provided with ports P100, P101, P102 for configuring a data path. Likewise, the fourth switch 40 (SW11) is provided with ports P110, P111, P112. The fifth switch 40 (SW12) is provided with ports P120, P121, P122. The three switches 40 (SW10, SW11, SW12) are connected to the SVP 190 via the network N00, similarly to the two switches 40 (SW00, SW01).

The first endpoint device 50 (ED0) is connected to an external host device via a channel C00. The host device is, for example, a computer that reads/writes data from/to the storage device 10. The ED0 is provided with a front end interface (FEI/F) 102. The FEI/F 102 performs mutual conversion of data transfer protocols on the channel C00 and within the SC 20. The SW10 and ED0 may be together packaged as one component 103.

The second endpoint device 50 (ED2) is connected to the DA 15 via the channel D00. The ED2 is provided with a back end interface (BEI/F) 106. The BEI/F 106 performs mutual conversion of data transfer protocols on the channel D00 and within the SC 20. The SW12 and ED2 may be together packaged as one component 107.

The third endpoint device 50 (ED1) is provided with a cache memory interface (CMI/F) 104 for connection to the cache memory (CM) 23. The CM 23 temporarily stores (caches) the data (data transferred with the FEI/F 102 or BEI/F 106) received from the first endpoint device 50 (ED0) and second endpoint device 50 (ED2). The CM 23 is used for storing both data and information located within the SC 20. Further, control information and the like is stored in a common memory region reserved in part of the storage region within the CM 23. Further, the SW11 and ED1 may be together packaged as one component 105.

The EPD 50 (ED0, ED1, ED2) are connected to the SVP 190 via the network N00. The SVP 190 sends setting information inputted by the administrator of the storage device 10 to the EPD 50 (ED0, ED1, ED2).

The SC 20 may be provided with one endpoint device instead of the ED0 (provided with FEI/F 102) and ED2 (provided with BEI/F 106), which are two endpoint devices 50. In this case, the one endpoint device performs the processing of two EPDs (ED0 and ED2).

The MR-PCIM (Multi-Root PCI Manager) has a function of setting and managing the PCIe fabric (internal network (CN)). Furthermore, concerning this feature, the MR-PCIM has a function of controlling the data path failover.

The MR-PCIM program is stored, for example, in the memory 22 (program 108) and operates on a processor 21. Alternatively, the MR-PCIM program operates on the SVP 190 (program 190) and may set and manage the PCIe fabric via the network N00 and the management port 191 of the switch 40.

The SR-PCIM (Single-Root PCI Manager) operates within virtual hierarchy (VH) of each root port. The SR-PCIM program is stored, for example, in the memory 22 (program 108) and operates on the processor 21.

A failover control program (FP) 110 that controls the failover of data path in the SC 20 (CN) is stored, for example, in the memory 22 and operates on the processor 21. The FP 110 may be implemented so as to be incorporated as a function of MR-PCIM, or may be implemented as an independent program. The FP 110 is implemented so that it can communicate directly or indirectly with the MR-PCIM and SR-PCIM.

In the present system (SC 20), both the MR-PCIM and the SR-PCIM operate. The SR-PCIM (operates within each VH) manages the SR-IOV characteristic of EPDs. The MR-PCIM manages the MR-IOV characteristic of EPDs. Mapping of VF to MVF is managed by the MR-PCIM. The MR-PCIM and SR-PCIM cooperatively control the VF migration.

The MR-PCIM is based on the MR-IOV specification. In the present example, respective MR-PCIM programs are arranged (108, 109) in three locations: two processors 21 (CPU0, CPU1) and SVP 190. Depending on the situation, one of these programs is operated in an active mode and the remaining two are for backup.

A failover control table (FT) 111 is contained as one set of information for storage in the shared memory region provided in part of the CM 23. The FT 111 is accessed and referred to from the processor 21 (failover control program (FP) 110). Because there is no communication between the RPs on the processor 21 side, the failover control program (FP) 110 is disposed in a location that can be accessed from the RPs of both processors 21 (CPU0, CPU1). In the present example, this location is within the CM 23. The failover control program (FP) 110 automatically executes the failover operation by referring to the FT 111.

<Endpoint Device ED0>

Figure 2:
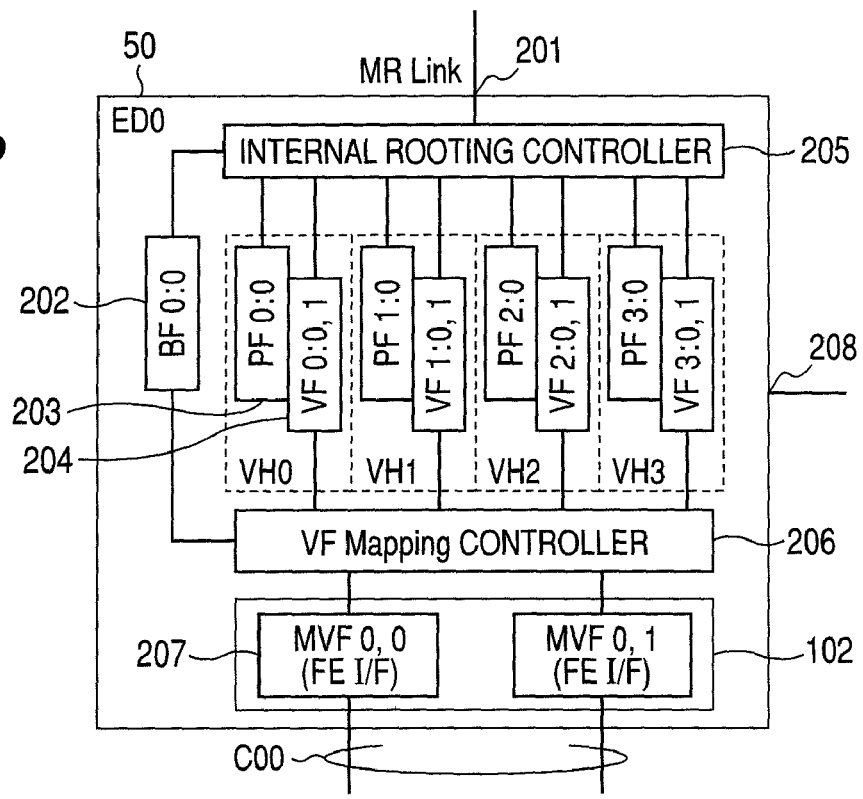
FIG. 2 shows a block configuration of an endpoint device (ED0) in Embodiment 1.

FIG. 2 shows a block configuration of the first endpoint device 50 (ED0). The ED0 is provided with a port 201 that can be connected to an MR-Link (Multi-Root Link (switch 40 side), an internal rooting controller 205, functions (BF 202, PF 203, VF 204), a VF mapping controller 206, an mission virtual function (MVF) 207 of the FEI/F 102, and a management port 208 that can communicate with the SVP 190 via the network N00.

The ED0 is provided with one base function 202 ("BF 0:0") that has a function number of 0 (base function is abbreviated as BF). The ED0 is also provided with a plurality (four) of physical functions ("PF 0:0", "PF 1:0", "PF 2:0", "PF 3:0") 203 associated with the BF 202 ("BF 0:0") (physical function is abbreviated as PF). Furthermore, the ED0 is provided with a plurality (four) of virtual functions 204 ("VF 0:0, 1", "VF 1:0, 1", "VF 2:0, 1", "VF 3:0, 1") associated with the PF for each PF (virtual function is abbreviated as VF). By supporting four VHs with these functions (BF, PF, VF), the ED0 can be set so as to enable the access from a total of four root ports (RP0, RP1, RP2, RP3) provided within the SC 20. For example, the "PF 0:0" and "VF 0:0, 1" correspond to the first VH (VH0).

The BF 202 serves to store basic settings. The VF 204 is for mapping to the MVF 207. The VF 204 and the like are the functions for data transfer corresponding to data writing or reading in the storage device 10. The BF is a function that manages the characteristics relating to the MR-IOV of the MRA device and also holds the mapping information of VF to MVF. The PF is a function that manages the characteristics of the device relating to the SR-IOV specifications. The VF is a function associated with the PF and shares one or more physical resources such as a link with the associated PF and also other VFs associated with the same PF. In the endpoint device of the present example, the BF, PF, and VF with a function number of 0 execute the interface functions such as FEI/F of the endpoint device.

A plurality (two) of MVF 207 ("MVF 0, 0", "MVF 0, 1") are the entities of FEI/F 102 functions (mission virtual function is abbreviated as MVF). In the present example, the ED0 is provided with two MVF 207, thereby making it possible to execute a maximum of two interface (FEI/F) functions in parallel at the same time.

The VF mapping controller 206 connects (maps) a maximum of two VF 204 from among a plurality of VF 204 ("VF 0:0, 1", "VF 1:0, 1", "VF 2:0, 1", "VF 3:0, 1") to the MVF 207 ("MVF 0, 0", "MVF 0, 1") at a one-to-one mapping on the basis of settings stored in the BF 202.

A flow of data from the port 201 to the channel C00 will be explained below. The ED0 transfers the data received by the port 201 to the internal rooting controller 205. The internal rooting controller 205 changes a path to each function according to the sending target of the received data. The VF mapping controller 206 transmits the data from the VF 204 to the MVF 207. The MVF 207 transfers the data to the channel C00. The flow of data from the channel C00 to the port 201 is reversed with respect to that described above.

The configuration of the second endpoint device 50 (ED2) is substantially identical to the configuration of the ED1 shown in FIG. 2, except that the MVF function is BEI/F 106 connected to the channel D00.

As for the description of the functions, for example, in "BF a:b", (a) is a VH number and (b) is a function number. Further, in "PF a:b", (a) is a VH number and (b) is a function number. In "VF a:b, c", (a) is a VH number, (b) is a function number, and (c) is a VF number. In "MVF a, b", (a) is a function number and (b) is an MVF number.

<Endpoint Device ED1>

Figure 3:
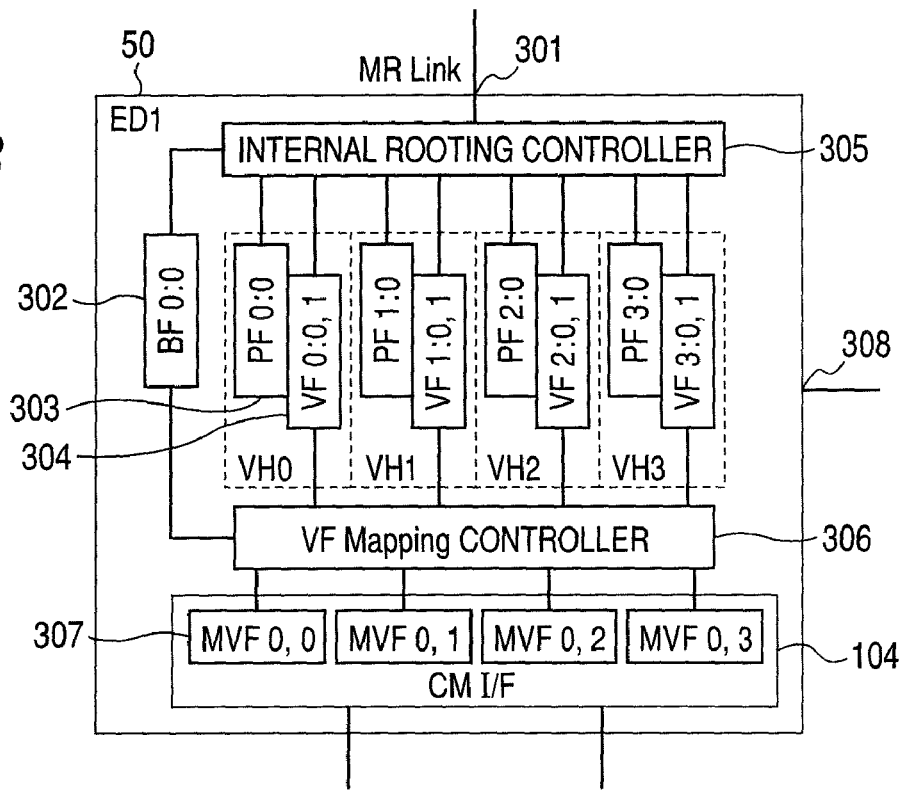
FIG. 3 shows a block configuration of an endpoint device (ED1) in Embodiment 1.

FIG. 3 shows a block configuration of the third endpoint device 50 (ED1). The ED1 is provided with a port 301 connectable to the MR-Link (switch 40 side), an internal rooting controller 305, functions (BF 302, PF 303, VF 304), a VF mapping controller 306, a mission virtual function (MVF)

307 of the CMI/F 104, and a management port 308 that can communicate with the SVP 190 via the network N00.

The ED1 is provided with one BF 302 ("BF 0:0") that has a function number of 0. The ED1 is also provided with a plurality (four) of PF 303 ("PF 0:0", "PF 1:0", "PF 2:0", "PF 3:0") associated with the BF 302 ("BF 0:0"). Furthermore, the ED1 is provided with a plurality (four) of VF 304 ("VF 0:0, 1", "VF 1:0, 1", "VF 2:0, 1", "VF 3:0, 1") associated with the PF for each PF. By supporting four VH in such a manner, the ED1 can be set so as to enable the access from a total of four root ports (RP0, RP1, RP2, RP3) provided within the SC 20.

MVF 307 ("MVF 0, 0", "MVF 0, 1", "MVF 0, 2", "MVF 0, 3") are the entities of CMI/F 104 functions. The ED1 is provided with four MVF 307, thereby making it possible to execute a maximum of four interface (CMI/F) functions in parallel at the same time.

The VF mapping controller 306 connects a maximum of four VF 304 from among a plurality of VF 304 ("VF 0:0, 1", "VF 1:0, 1", "VF 2:0, 1", "VF 3:0, 1") to the MVF 307 ("MVF 0, 0", "MVF 0, 1", "MVF 0, 2", "MVF 0, 3") at a one-to-one mapping on the basis of settings stored in the BF 302. In the ED1 provided with the CMI/F 104, all the VF 304 can be mapped to the MVF 307.

A flow of data from the port 301 to the CM 23 connection channel will be explained below. The ED1 transfers the data received by the port 301 to the internal rooting controller 305. The internal rooting controller 305 changes a path to each function according to the sending target of the received data. The VF mapping controller 306 transmits the data from the VF 304 to the MVF 307. The MVF 307 transfers the data to the CM 23 connection channel. The flow of data from the CM 23 connection channel to the port 301 is reversed with respect to that described above.

The number (x) of MVFs (that are associated with the CMI/F 104) that will be mapped to the VFs in the ED1 is equal to or larger than the number (y; in the present example, this number is 4) of RPs for access to the ED1 (in the present example, x=y=4).

<Initial Settings>

The tables storing the information on initial settings of the PCIe fabric constituting the internal network (CN) of the SC 20 will be explained below one after another. The tables include a switch port type management table 400 shown in FIG. 4, a VH and VF mapping policy management table 500 shown in FIG. 5, switch management tables 600, 700, 800, 900, 1000 for each switch (SW00-SW12) shown in FIGS. 6 to 10, and VF mapping management tables 1100, 1200, 1300 for each EPD 50 (ED0, ED1, ED2) shown in FIGS. 11-13.

<Switch Port Type Management Table>

FIG. 4 is an explanatory drawing of the switch port type management table 400. The switch port type management table 400 stores the association of switch ports ("Switch Port") (a) (the port number of the switch 40; for example, "P000") within the SC 20 and the port type ("PCIM Capable") (b) as items (columns). The MR-PCIM initializes the PCIe fabric via the switch port for which the port type (b) is Yes. The port type (b) of the switch port (a) to which only the EPD 50 is connected is No.

<VH and VF Mapping Policy Management Table>

FIG. 5 is an explanatory drawing of the VH and VF mapping policy management table 500. The VH and VF mapping policy management table 500 has "VH" (a), "Authorized" (b), "VH Mapping (c) {"VS in" (d), "Inter-SW Link" (e), "VH in" (f)}, and "VF Mapping" (g).

The RP (RP number) of each VH is stored in the (a). Where the MR-PCIM may operate on the RP stored in the (a), the "Authorized" (b) is Yes. In the present embodiment, the MR-PCIM is so set that it can operate on all the RPs to ensure redundancy.

The VH mapping setting information is stored in (c). The virtual switch (VS) from among the switches 40 used in each VH is stored in the (d). In the present example, a virtual switch (VS) present within the three switches 40 (SW10, SW11, SW12) on the connection side of the EPD 50 is used in all the VHs. For example, the VS of SW00 and three switches (SW10, SW11, SW12) is set in the VH of the RP0.

Virtual switch (VS) is a term based on the MR-IOV specification. One or more VSs are mapped and provided within the switch devices 40. For example, two VSs (VS0, VS1) are present within the SW00.

A list of inter-switch link used in each VH is stored in the (e). In the present example, each VH uses one link from among the two inter-switch links of each of three switches (SW10, SW11, SW12) on the connection side of the EPD 50. For example, in the VH of the RP0, a P002-P100 link (path between SW00-SW10), a P003-P110 link (path between SW00-SW11), and a P004-P120 link (path between SW00-SW12) are set as inter-switch links.

The list of the EPD 50 that belong to each VH is stored in the (f). In the present example, all the EPD 50 (ED0, ED1, ED2) belong to each VH.

The (g) stores the VF mapping setting information. In the present example, one VF is allocated to each EPD 50 in each VH. The number of VFs in each EPD 50 that are allocated to each VH is not limited to 1 and may be larger than 1. In the present example, each EPD 50 supports the number of VFs that is equal to or larger than the number of VHs (number of root ports for access).

<Switch Management Table of Each Switch>

FIGS. 6 to 10 are explanatory drawings of switch management tables of each of five switches 40 (SW00-SW12). FIG. 6 shows a switch management table 600 of the first switch 40 (SW00). FIG. 7 shows a switch management table 700 of the second switch 40 (SW01).

The switch management table has "Slot" (a), "Root" (b), "VS" (c), "Bridge" (d), "Enable" (e), "Mapped" (f), "Port" (g), and "Port VHN (port VH number)" (h) as items.

In the present embodiment, four RPs (RP0, RP1, RP2, RP3) are the RPs of the PCIe base specification, as shown in rows 601, 603, 701, 703. Therefore, the "Port VHN" (h) (port VH number) of the port connected to the RP in each switch 40 becomes "VH0". The port VH number is the VH number that is used in the link connected to each port of the switch 40 (terms are based on the MR-IOV specification).

In the present example, in the switch management table 600 of SW00, the "Port VHN" (h) of the port downstream of the virtual switch VS0 connected to the RP0 is mapped to the "VH0" (602). Further, the "Port VHN" of the port downstream of the virtual switch VS1 connected to the RP2 is mapped to the "VH1" (604).

In the present example, in the switch management table 700 of SW01, the "Port VHN" (h) of the port downstream of the virtual switch VS0 connected to the RP1 is mapped to the "VH0" (702). Further, the "Port VHN" of the port downstream of the virtual switch VS1 connected to the RP3 is mapped to the "VH1" (704).

The downstream side with respect to the "Bridge" (d), is the endpoint device side of SW00, SW01 in FIG. 1, and the upstream side is the root port side of SW00, SW01 in FIG. 1.

FIG. 8 is a switch management table 800 of the third switch 40 (SW10). In the present example, the VH number corresponding to the VH for which the RP0 is a root port is taken as VH0 in the link connecting the EPD 50 with the switch 40

(SW10, SW11, SW12). Likewise, VH1 is taken correspondingly to the RP1, VH2 is taken correspondingly to the RP2, and VH3 is taken correspondingly to the RP3. In the present example, the "Port VHN" (h) of the port P102 on the downstream side of SW 10 is mapped to "VH0" (801) when the RP is RP0. The "Port VHN" (h) of the port P102 is mapped to "VH1" (802) when the RP is RP1, to "VH2" (803) when the RP is RP2, and to "VH3" (804) when the RP is RP3.

FIG. 9 is a switch management table 900 of the fourth switch 40 (SW11). In the present example, the "Port VHN" (h) of the port P112 on the downstream side of SW 11 is mapped to "VH0" (901) when the RP is RP0. The "Port VHN" (h) of the port P112 is mapped to "VH1" (902) when the RP is RP1, to "VH2" (903) when the RP is RP2, and to "VH3" (904) when the RP is RP3.

FIG. 10 is a switch management table 1000 of the fifth switch 40 (SW12). In the present example, the "Port VHN" (h) of the port P122 on the downstream side of SW 12 is mapped to "VH0" (1001) when the RP is RP0. The "Port VHN" (h) of the port P122 is mapped to "VH1" (1002) when the RP is RP1, to "VH2" (1003) when the RP is RP2, and to "VH3" (1004) when the RP is RP3.

Settings preceding the state shown in FIG. 10 are the values of system hardware initial settings and are set in advance at a design-production stage of the present system. Further, the administrator sets the values of necessary items in the tables shown in FIG. 11 etc. correspondingly to specific examples of system use.

<VF Mapping Management Table (1) of Each EPD>

FIGS. 11 to 13 are explanatory drawings of VF mapping management tables (1100, 1200, 1300) of each EPD 50 (ED0, ED1, ED2). These VF mapping management tables are stored within the BF of each EPD 50 and set and managed by the MR-PCIM.

FIG. 11 is an explanatory drawing of the VF mapping management table 1100 of the first EPD 50 (ED0) (provided with FEI/F 102). The VF mapping management table 1100 has "PF" (a), "LVF#" (b), "VF State" (c), "VF" (d), and "MVF" (e) as items. (d) and (e) indicate mapping of VFs to MVFs. The LVF in the "LVF#" (b) is a logical VF (the term based on the MR-IOV specification). Within the BF, the VF is managed as the LVF. According to the MR-IOV specification, the correspondence of "LVF#" (b), "VF State" (c), and "MVF" (e) is stored as the LVF table within the BF. The LVF table does not store the information relating to HV. The information of the LVF table is sufficient for VF migration control, but in the present system, the LVF table is expanded to a VF mapping management table with the VH information added thereto by adding the "PF" (a) and "VF" (d) items to the LVF table. As a result, in the present example, a root port from which the LVF and MVF can be accessed can be easily determined.

The "VF state" (c) of the VF ("VF 0:0, 1") that belongs to the VH0 is "Active. Available (A. A)" and mapped to the MVF ("MVF 0,0") (1101). The "VF State" (c) of the VF ("VF 1:0, 1) that belongs to the VH1 is "Inactive. Unavailable (I. U)" and is not mapped to the MVF ("none") (1102). The "VF State" (c) of the VF ("VF 2:0, 1") that belongs to the VH2 is "A. A" and is mapped to the MVF ("MVF 0, 1") (1103). The "VF State" (c) of the VF ("VF 3:0, 1) that belongs to the VH3 is "I. U" and is not mapped to the MVF ("none") (1104). As a result of these VF mappings, the ED0 can be accessed from the RP0 and RP2 and cannot be accessed from the RP1 and RP3 in the initial state.

FIG. 12 is an explanatory drawing of the VF mapping management table 1200 of the third EPD 50 (ED1) (provided with CMI/F 104). The "VF state" (c) of the VF ("VF 0:0, 1") that belongs to the VH0 is "A. A" and mapped to the MVF ("MVF 0, 0") (1201). The "VF State" (c) of the VF ("VF 1:0, 1) that belongs to the VH1 is "A. A" and mapped to the MVF ("MVF 0, 1") (1202). The "VF State" (c) of the VF ("VF 2:0, 1) that belongs to the VH2 is "A. A" and mapped to the MVF ("MVF 0, 2") (1203). The "VF State" (c) of the VF ("VF 3:0, 1) that belongs to the VH3 is "A. A" and mapped to the MVF ("MVF 0, 3") (1204). As a result of these VF mappings, the ED1 can be accessed from all the four RP (RP0, RP1, RP2, RP3) in the initial state.

In the table settings of the ED1 provided with the CMI/F 104, in particular, all the VF states are "A. A". This is because in the CMI/F 104, by contrast with the FEI/F 102 and BEI/F 106, the configuration provides VF resources that can be accessed from all the RP.

FIG. 13 is an explanatory drawing of the VF mapping management table 1300 of the second EPD 50 (ED2). Basically, this table is identical to that relating to the ED1. The "VF state" (c) of the VF ("VF 0:0, 1") that belongs to the VH0 is "I. U" and is not mapped to the MVF (1301). The "VF State" (c) of the VF ("VF 1:0, 1) that belongs to the VH1 is "A. A" and mapped to the MVF ("MVF 0, 0") (1302). The "VF State" (c) of the VF ("VF 2:0, 1) that belongs to the VH2 is "I. U" and is not mapped to the MVF (1303). The "VF State" (c) of the VF ("VF 3:0, 1) that belongs to the VH3 is "A. A" and mapped to the MVF ("MVF 0, 1") (1304). As a result of these VF mappings, the ED2 can be accessed from the RP1 and RP3 and cannot be accessed from the RP0 and RP2 in the initial state.

<Setting and Example of Use>

Figure 26:
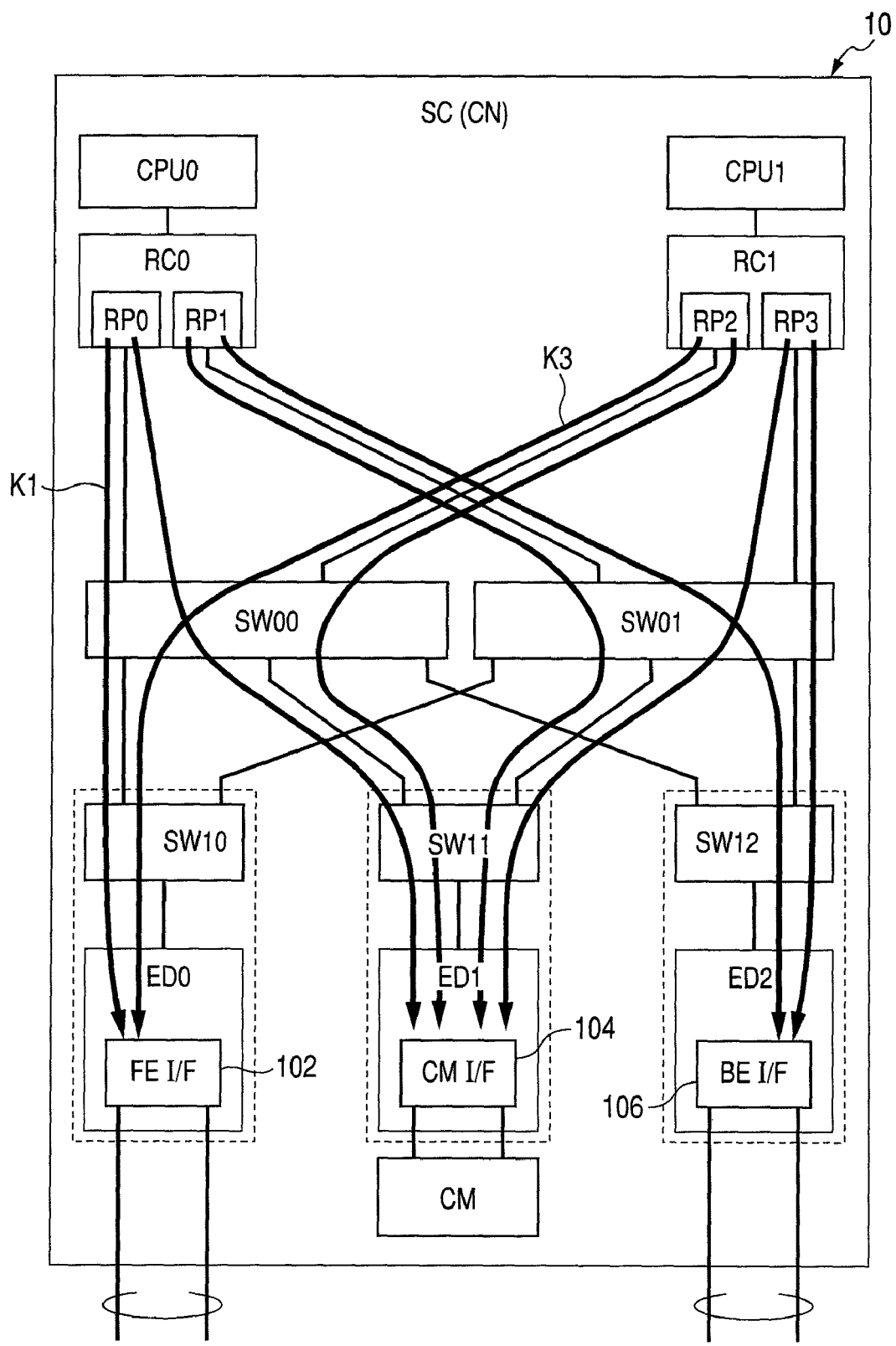
FIG. 26 is an explanatory drawing of an example of use (first mode) of the storage device of one embodiment.

In the present embodiment, as an example of use, data transfer is executed between the ED0 (provided with FEI/F 102) and ED1 (provided with CMI/F 104) in the VH in which the RP0 and RP2 are RPs, and data transfer is executed between the ED2 (provided with BEI/F 106) and ED1 (provided with CMI/F 104) in the VH in which the RP1 and RP3 are RPs according to the settings made by the administrator on the basis of the above-described initial settings. FIG. 26 illustrates an example of use such as described above.

In the example of use shown in FIG. 26, the MVF (FEI/F 102) of ED0 and MVF (CMI/F 104) of ED1 are set so that they can be accessed from the same RP (for example, RP0) and the MVF (BEI/F 106) of ED2 and MVF (CMI/F 104) of ED1 are set so that they can be accessed from the same RP (for example, RP3) as a data path in the internal network (CN). For this purpose, the number of MVF provided to the ED1 is equal to or larger than the number of root ports for access to the ED1, and the number of MVF provided to the ED0 and ED2 is equal to or larger than half the root ports for access to the ED1. As a result, data can be transferred between the MVF (FEI/F 102) of ED0 and MVF (CMI/F 104) of ED1 and between the MVF (BEI/F 106) of ED2 and MVF (CMI/F 104) of ED1.

Further, two RC 30 (RC0, RC1) connected to respective processors 21 in the internal network (CN) have respective two RP (first RP, second RP), the first RP (RP0, RP2) of each RC 30 is set to enable the access to the MVF (FEI/F 102) of ED0 and MVF (CMI/F 104) of ED1, and the second RP (RP1, RP3) of each RC 30 is set to enable the access to the MVF (BEI/F 106) of ED2 and MVF (CMI/F 104) of ED1 as the data path.

For example, in the RC0 connected to the CPU0, the FEI/F 102 (ED0) and CMI/F 104 (ED1) can be accessed from the RP0, and the BEI/F 106 (ED2) and CMI/F 104 (ED1) can be accessed from the RP1.

In the present example of use, data transfer using the FEI/F 102 and CMI/F 104 (for example, data input/output from the host device) and data transfer using the BEI/F 106 and CMI/F 104 (for example, data input/output to the DA 15) can be processed in parallel at the same time and with high efficiency.

In the storage device 10 of the present example of use, data transfer between the FEI/F 102 and BEI/F 106 is performed via the CM 23. The VH allocation such as in the above-described setting example in which the VH at the FEI/F 102 side is different from that at the BEI/F 106 side is suitable for such a purpose. Further, because the CPU0 uses two RPs (RP0, RP1) of RC0 and the CPU1 uses two RPs (RP2, RP3) of RC1, each processor 21 can control the transfer of data on both the FEI/F 102 side and the BEI/F 106 side. From the standpoint of load balancing and redundancy, this feature is also suitable for the storage device.

<Topology of Internal Network>

Figure 14:
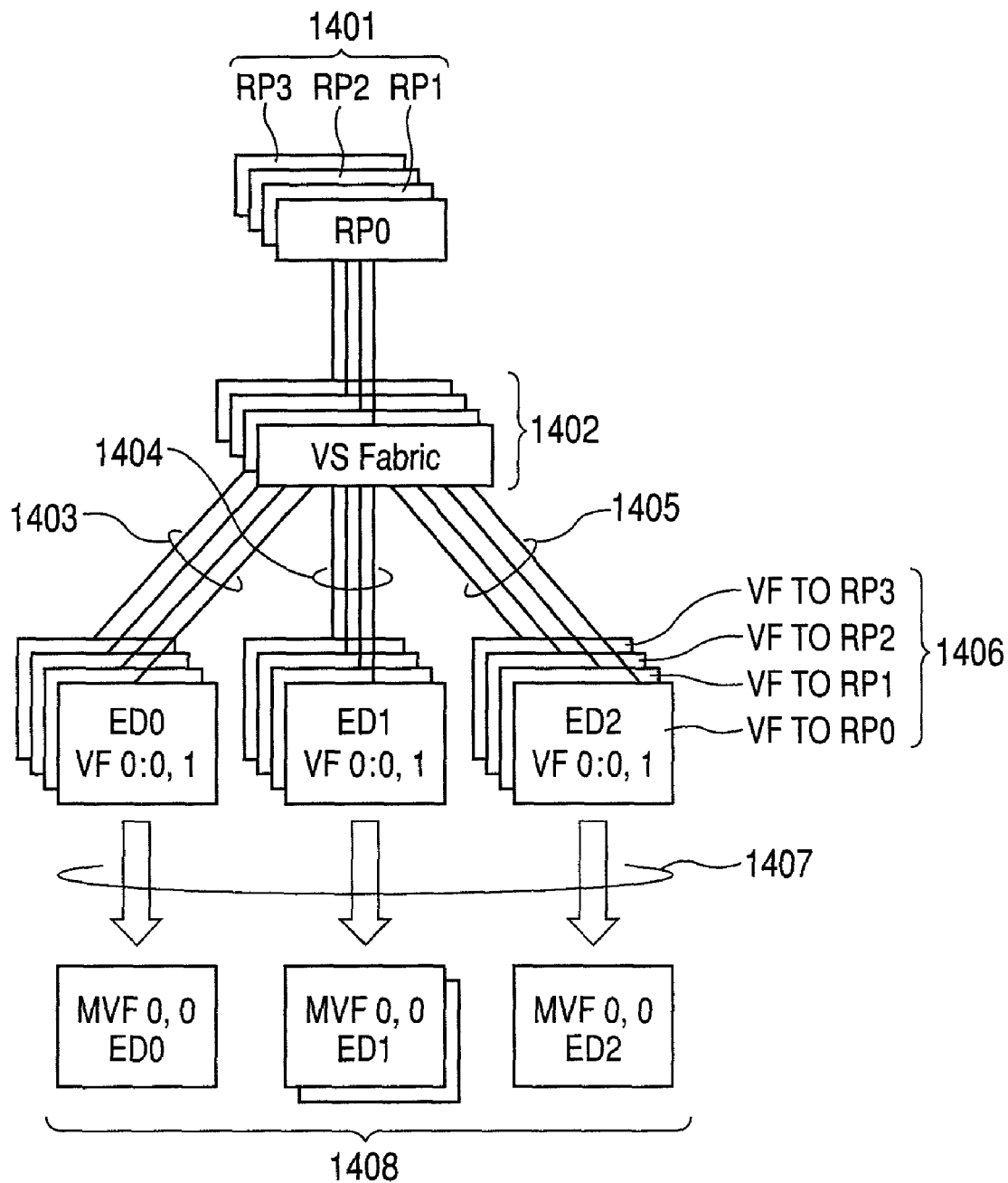
FIG. 14 is an explanatory drawing of virtual topology of the internal network in Embodiment 1.

FIG. 14 shows virtual topology of the internal network (CN) of SC 20 after initial settings of the PCIe fabric explained hereinabove. All the RP 1401 are connected to VF 1406 (VF to RP0, VF to RP1, VF to RP2, VF to RP3) allocated to respective VHs within the EPD 50 (ED0, ED1, ED2) via the virtual switch fabric (VS Fabric) 1402 (corresponds to switch 40 (VS)). Connection between the VS Fabric 1402 and EPD 50 (VF 1406) is performed by MR-Links (1403, 1404, 1405). The VF 1406 is connected to MVF 1408 ("MVF 0, 0", "MVF 0, 1", etc.) of each EPD 50 by the VF mapping 1407. In the PCIe fabric of the present example, the VF allocated to each RP (allocated to each VH) for each EPD 50 is provided, and each RP can individually access the VF within each EPD 50. However, the VF that can actually use the functions of the EPD 50 is the VF connected to the MVF by VF mapping.

<Failover Management Table>

FIG. 15 is an explanatory drawing of a failover management table 1500 (aforementioned FT 111). As described hereinabove, the failover management table 1500 is referred to by the failover control program (FP) 110 and stored in the shared memory region provided in part of the CM 23. The FP 110 can refer to the failover management table 1500 from each RP (RP0-RP3) and accesses the EPD 50 (ED0-ED2) by using the data path set to enable ("E") within the table. The ED1 connecting the CM 23 in which the failover management table 1500 is stored sends an interrupt to all the RPs (RP0-RP3) when a change has occurred in the data stored within the table. The RPs that have received the interrupt confirm the change contents of the table and, if necessary, change the data path for accessing each EPD 50.

The failover management table 1500 has the following items "Data Path in Normal State" A (a-d), "Alternative Data Path" B (e-h), "VF Migration" C (i), "Involved Data Path (First-Stage Link Failure)" D (j-l), and "Involved Data Path (Second-Stage Link Failure)" E (m-o). There are "S" (Status) (a), "Root" (RP) (b), "ED" (EPD) (c), and "VF" (d) for the "Data Path in Normal State" A. Likewise, there are "S" (e), "Root" (f), "ED" (g), and "VF" (h) for the "Alternative Data Path" B. There are "Root" (RP) (j), "ED" (EPD) (k), and "VF" (l) for the "Involved Data Path (First-Stage Link Failure)" D. Likewise, there are "Root" (m), "ED" (n), and "VF" (o) for the "Involved Data Path (Second-Stage Link failure)" E.

With the setting example shown in FIG. 15, the data path in a normal state prior to the failover is as shown in FIG. 26 (for example, data path K1).

The "Data Path in Normal State" A (a-d) stores a data path ("Data Path in Normal State": first data path) in a normal state (or initial state) that is used by each RP to access each EPD 50 and a status of this data path. In the Data Path in Normal State, (b) stores an access source RP, (c)—an access target EPD 50, (d)—a VF within the access target EPD 50, and (a)—a status of the data path. The status (a) can be "E" (Enable) or "D" (Disable).

The "Alternative Data Path" B (e-h) stores a data path ("Alternative Data Path": second data path) that is used as an alternative data path in the case a failure has occurred in the data path in a normal state (or initial state) that has been stored in A (a-d), and also a status of the alternative path. In the Alternative Data Path, (f) stores an access source RP, (g)—an access target EPD 50, (h)—a VF within the access target EPD 50, and (e) a status of the data path.

Where the data path in a normal state (A) and the alternative data path (B) are identical, the same values are stored in the status (a) and the status (e).

The "VF Migration" C (i) stores information on whether (yes/no) the VF migration for executing the failover (switching from the first data path to the second data path) of the data path has been requested. With respect to the data path for which the access target EPD 50 is ED1, the VF migration is set to (no).

A feature of the present embodiment is that the data path failover is realized by using the VF migration. For example, the ED0 can be accessed from the RP0 and RP2 in the initial state (data paths K1, K3 in FIG. 26). Where a failure occurs in the data path in the initial state, as a result of changing the access source RP (and changing the access target VF) and executing the VF migration, it is possible to change the data path, for example, so that the ED0 becomes accessible from the RP1 or RP2 and the failed link can be avoided (the case of failover from K1 to K2 in FIGS. 16, 17, 26, and 27).

Figure 27:
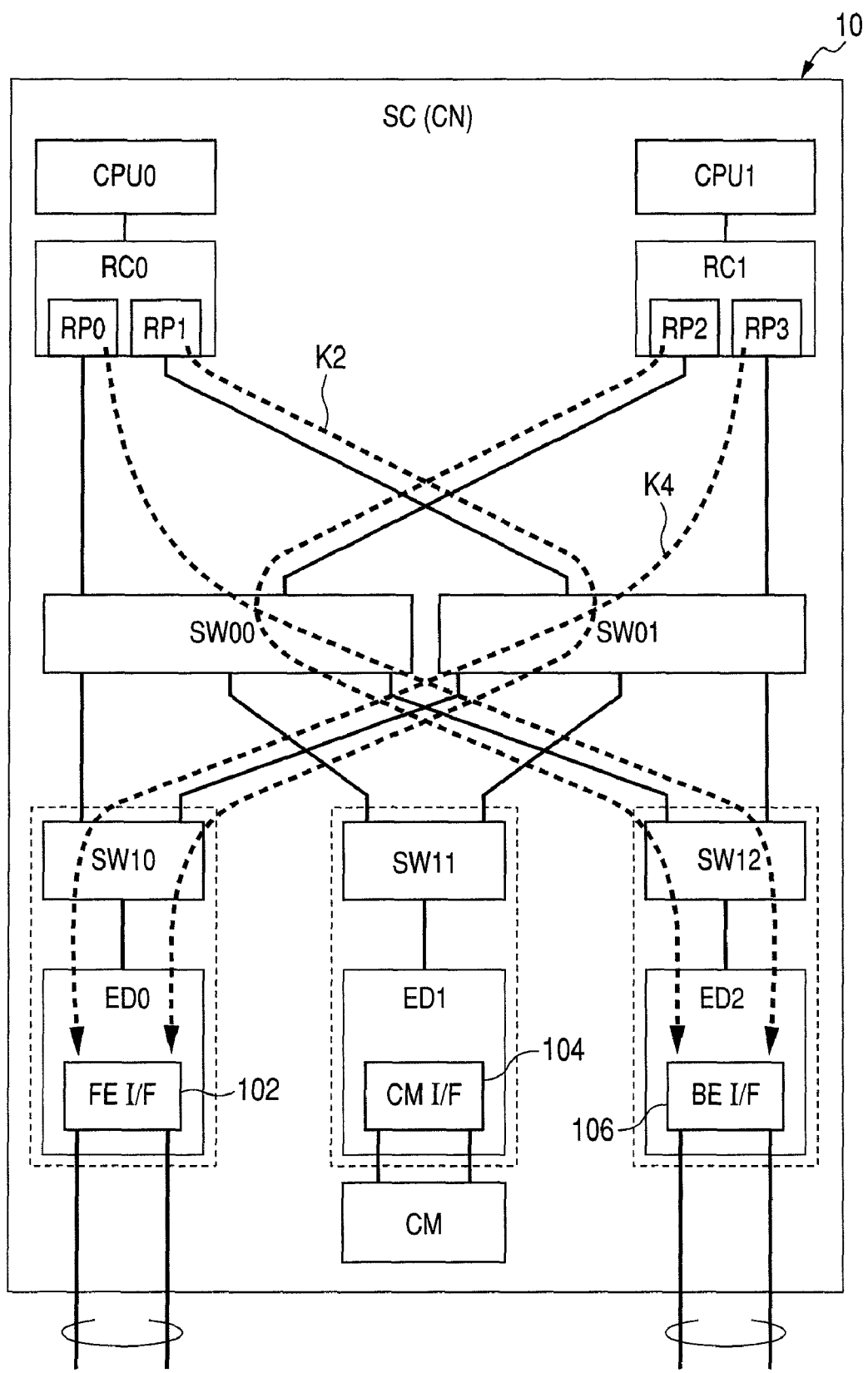
FIG. 27 is an explanatory drawing of an example of use (second mode) of the storage device of one embodiment.

FIG. 27 shows alternating data paths corresponding to the settings shown in FIG. 15 (the path to ED1 is omitted). For example, K2 corresponds to K1, and K4 corresponds to K3. The links in the data path in a normal state are different from those of the alternative data path.

As for the ED1, the MVFs (four) are mapped with respect to the access from all the RPs (four). Therefore, even when access from a certain RP to the ED1 fails, the access to the ED1 from another RP can be enabled by changing the access source RP ("VF Migration" is not required) (it is not necessary to enable the VF migration control function in the ED1).

The "Involved Data Path (First-Stage Link Failure)" D (j-l), and "Involved Data Path (Second-Stage Link Failure)" E (m-o) store data paths (involved data paths) in which a failure can simultaneously occur when a failure has occurred in a data path stored in the A. For example, when a failure has occurred on a link connecting the RP0 to the SW00, a failure can be also considered to occur on a data path for accessing the ED1, ED2 from the RP0 in addition to the data path by which the ED0 is accessed from the RP0.

When a failure occurs on a link (first-stage link, upstream link) connecting each RP to the first switch 40 (SW00) or second switch 40 (SW01), which are the RP connection switches (first-stage link failure), (j) stores an access source RP, (k) stores an access target EPD 50, and (l) stores a VF within the access target EPD 50 with respect to a data path (involved data path) in which a failure can occur in combination with that in the data path in a normal state.

When a failure occurs on a link (second stage link) connecting SW00 or SW01, which are the RP connection switches, to the third switch 40 (SW10) or fourth switch 40 (SW11) or fifth switch (SW12), which is the EPD 50 connection switch (second-stage link failure), (m) stores an access source RP, (n) stores an access target EPD 50, and (o) stores an access target EPD 50 with respect to a data path (involved data path) in which failure can occur in combination with the data path in a normal state.

Further, in the present example, the ED0 provided with the FEI/F 102 and the ED1 provided with the CMI/F 104 perform data transfer with the same VH, and the ED2 provided with the BEI/F 106 and the ED1 provided with the CMI/F 104 perform data transfer with the same VH. The administrator of the storage device 10 sets the failover management table 1500 so that such transfer conditions are satisfied in both the data path in a normal state and the alternating data path.

<Failover Operation>

FIGS. 16 and 17 are explanatory drawings illustrating a failover operation. The case is shown in which failover is performed from the first data path K1 to the second data path K2 on the basis of the configuration shown in FIG. 1.

For example, as shown in FIG. 16, the first data path K1 (path via links L1, L2, L5) for accessing the ED0 through the first switch 40 (SW00) and third switch 40 (SW10) from the RP0 within the RC0 serves as a data path in a normal state. A case will be considered in which a failure then occurs, for example, in the link L2 between the SW00 and SW10 on the first data path K1. In this case, a reference to the failover management table 1500 demonstrates that a data path alternative to the data path (K1) in which the failure has occurred is the second data path K2 (path via links L3, L4, L5) for accessing the ED0 from the RP1 within the RC0 via the second switch 40 (SW01) and third switch 40 (SW10). Therefore, a failover operation from the first data path K1 to the second data path K2 is performed.

FIG. 17 is an explanatory drawing relating to a data path change (and the operation of VF migration for realizing the failover) in the virtual topology of CN shown in FIG. 14. The left side is the topology as viewed from the RP0 and the right side is the topology as viewed from the RP1.

The first data path K1 (normal state→failure state) shown in FIG. 16 is equivalent to a data path from the RP0 within the RC0 to the first VF 1702 within the ED0 ("VF 0:0, 1") via the VS Fabric (VS) in FIG. 17. In the normal state, the first VF 1702 ("VF 0:0, 1") and MVF 1701 ("MVF 0,0") are connected (mapped) by the VF mapping 1704.

The second data path K2 (alternative) shown in FIG. 16 is equivalent to a data path from RP1 within the RC0 to the second VF 1703 ("VF 1:0, 1") within the ED0 via the VS Fabric (VS) in FIG. 17.

As shown hereinabove, the access source RP is changed from RP0 to RP1 and the VF migration (change of VF and MVF mapping) is performed for a failover from K1 to K2. The access target VF is changed in response to the VF migration. The MR-PCIM executes the VF migration to connect (map) the second VF 1703 ("VF 1:0, 1") to MVF 1701 ("MVF 0, 0"). As a result of executing such VF migration, the connection of MVF 1701 ("MVF 0, 0") to the first VF 1702 ("VF0:0, 1") by the VF mapping 1704 is canceled, and the MVF 1701 ("MVF0, 0") is connected to the second VF 1703 ("VF 1:0, 1") by a new VF mapping 1705. With the VF migration of the present example, the access target VF is changed from "VF 0:0, 1" to "VF 1:0, 1", and the state of VF mapping 1704 is changed to the state of VF mapping 1705. As a result, the second data path K2 can be used.

As described hereinabove, in the present embodiment, the data path failover is realized by the access source RP change and VF migration.

<Data Path Failover Method>

Figure 18:
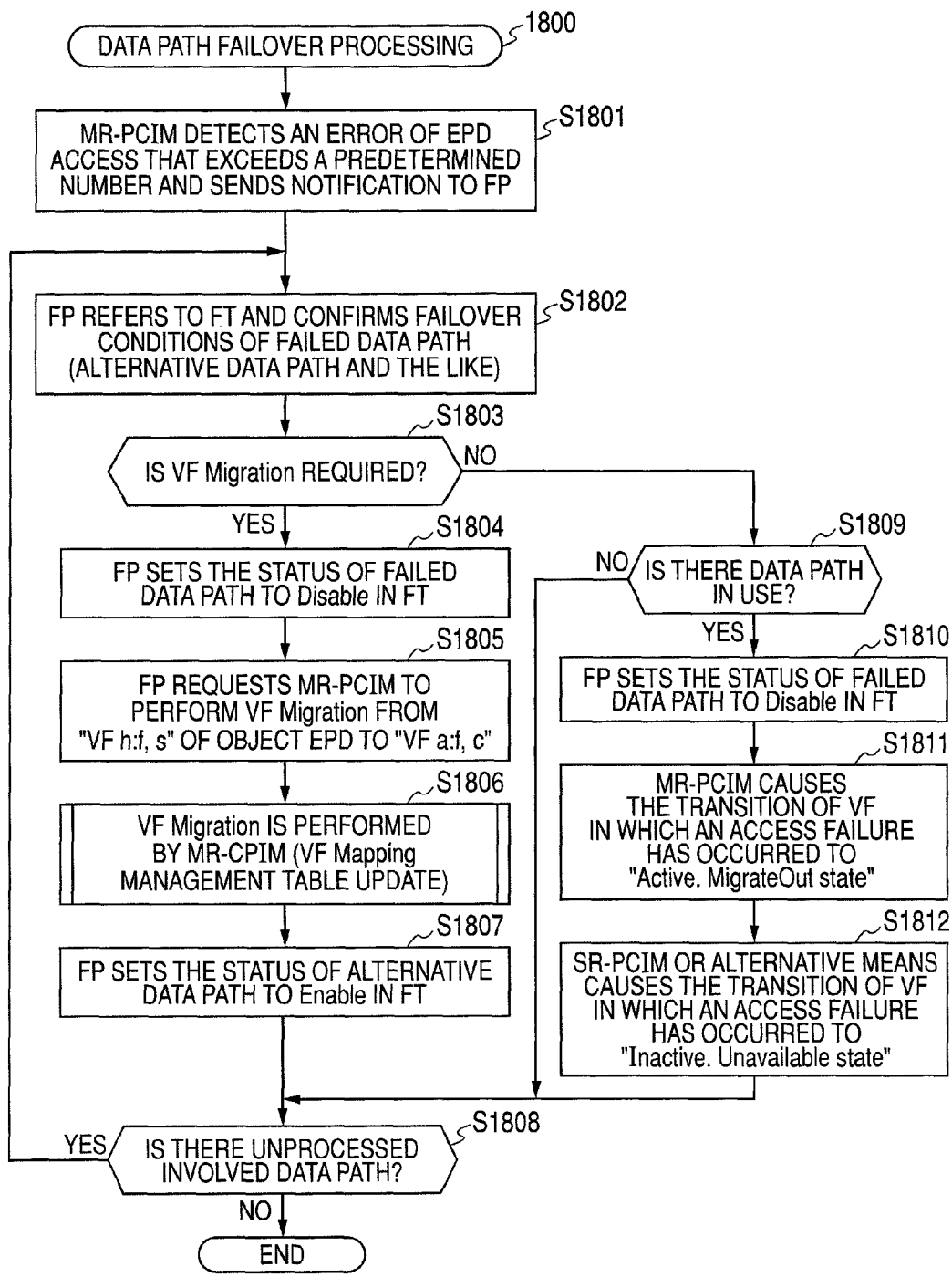
FIG. 18 is a flowchart illustrating the failover processing in Embodiment 1.

FIG. 18 is a flowchart (S denotes a processing step) of a data path failover method and processing (1800) in the storage device 10 of the present embodiment. The processing can be summarized as follows: the MR-PCIM detects an error (a failure) on a data path, the FP 110 confirms failover conditions by referring to the FT 111, and the MR-PCIM and SR-PCIM perform the VF migration control.

In S1801, where the MR-PCIM detects an error exceeding a predetermined cycle number in data transfer between the RP and EPD 50 or between two EPD 50 (EPD 50 access), the failover control program (FP) 110 is notified thereabout.

In S1802, the FP 110 refers to the failover management table (FT) 1500 (111) and confirms failover conditions of the data path in which the failure has occurred (the above-described alternative data path, VF Migration yes/no, involved data path, etc.).

In S1803, the FP 110 refers to the "VF Migration" C item of FT 1500 and determines whether or not the VF migration is required. Where it is required (yes), the processing flow advances to S1804.

In S1804, the FP 110 sets the status (a) of the data path in a failure state ("Data Path in Normal State" A) of the FT 1500 to "D" (Disable).

In S1805, the FP 110 requests the MR-PCIM to execute the VF migration from "VF h:f, s" to "VF a:f, c" that corresponds to the VF within the object EPD 50 (here, f, h, s, a, c are numerical values).

In S1806, the MR-PCIM executes the VF migration and updates the VF mapping management table of EPD 50.

In S1807, the FP 110 sets the status (e) of the alternative data path ("Alternative Data Path" B) of the FT 1500 to "E" (Enable).

In S1808, the presence of an unprocessed involved data path is determined. Where the unprocessed involved data path is present, the processing flow returns to S1802, and where no such data path is present, the processing ends. For example, where a failure occurs in a link (upstream side) connecting the RP and the switch 40, a failure occurs in the access to a plurality of EPD 50 and it is necessary to execute a plurality of data path failover operations. In this case, the involved data path serving as an object of the data path failover is stored in "Involved Data Path" D, E of FT 1500.

Where the VF Migration is not required (no) in S1803, the processing flow advances to S1809. In S1809, it is determined whether the failed data path is a data path in use. In the data path in use, the status of FT 1500 becomes "E" (Enable). When the status is "E" (Enable), the processing flow advances to S1810, and where the status is "D" (Disable), the processing advances to S1808. With the settings of FT 1500 shown in FIG. 15 in the present example, the status of the data path for accessing ED1 (provided with the CMI/F 104) from each RP from which VF Migration during data path failover is not required is "E" (Enable).

In S1810, the FP 110 sets the status of the failed data path in the FT 1500 to "D" (Disable).

In S1811, the MR-PCIM causes the transition of VF in which an access failure has occurred from "Active. Available state (A. A)" to "Active. MigrateOut state (A. M)".

In S1812, the SR-PCIM operating within the failed VH or alternative means causes the transition of VF in which an access failure has occurred from "A. M" to "Inactive. Unavailable state (I. U)". In case of communication failure between SR-PCIM and VF, the alternative means controls the VF state transition instead of SR-PCIM (described below as Embodiment 2).

<VF Mapping Management Table (2) for Each EPD>

FIG. 19 shows an example (after a change) of a VF mapping management table (1100b) of ED0 (provided with the FEI/F 102). In the state shown in FIG. 19, the mapping of MVF ("MVF 0, 1") of ED0 is changed from the VH2 (VF "VF 2:0, 1") to VH3 (VF "VF 3:0, 1") (rows 1901, 1902) correspondingly to the state of the VF mapping management table 1100 in FIG. 11. As shown in FIG. 12, the ED1 (provided with the CMI/F 104) can be accessed ("VF State" is "A. A") in the VH3, similarly to the ED0. Therefore, even in the mapping state shown in FIG. 19, the ED0 and ED1 can operate within the same VH3. However, because the ED2 uses the VH3 as shown in FIG. 13, data transfer on the FEI/F 102 side and BEI/F 106 side is generated within the same VH3.

FIG. 20 shows an example of the VF mapping management table (1300b) of ED2 (provided with the BEI/F 106). In the state shown in FIG. 20, the mapping of the MVF ("MVF 0, 1") of ED2 is changed from the VH3 ("VF 3:0, 1") to VH2 ("VF 2:0, 1") (rows 2001, 2002) correspondingly to the state of the VF mapping management table 1300 in FIG. 13.

As a result of these VF Migrations (FIG. 19, FIG. 20), the ED0 provided with the FEI/F 102 and the ED1 provided with the CMI/F 104 perform data transfer with the VF0 and VF3, and the ED2 provided with the BEI/F 106 and the ED1 provided with the CMI/F 104 perform data transfer with the VH1 and VH2. Thus separating the VH for use in data transfer with the FEI/F 102 and BEI/F 106 is more effective because the processor load and traffic within the fabric (internal network (CN)) can be balanced.

Figure 28:
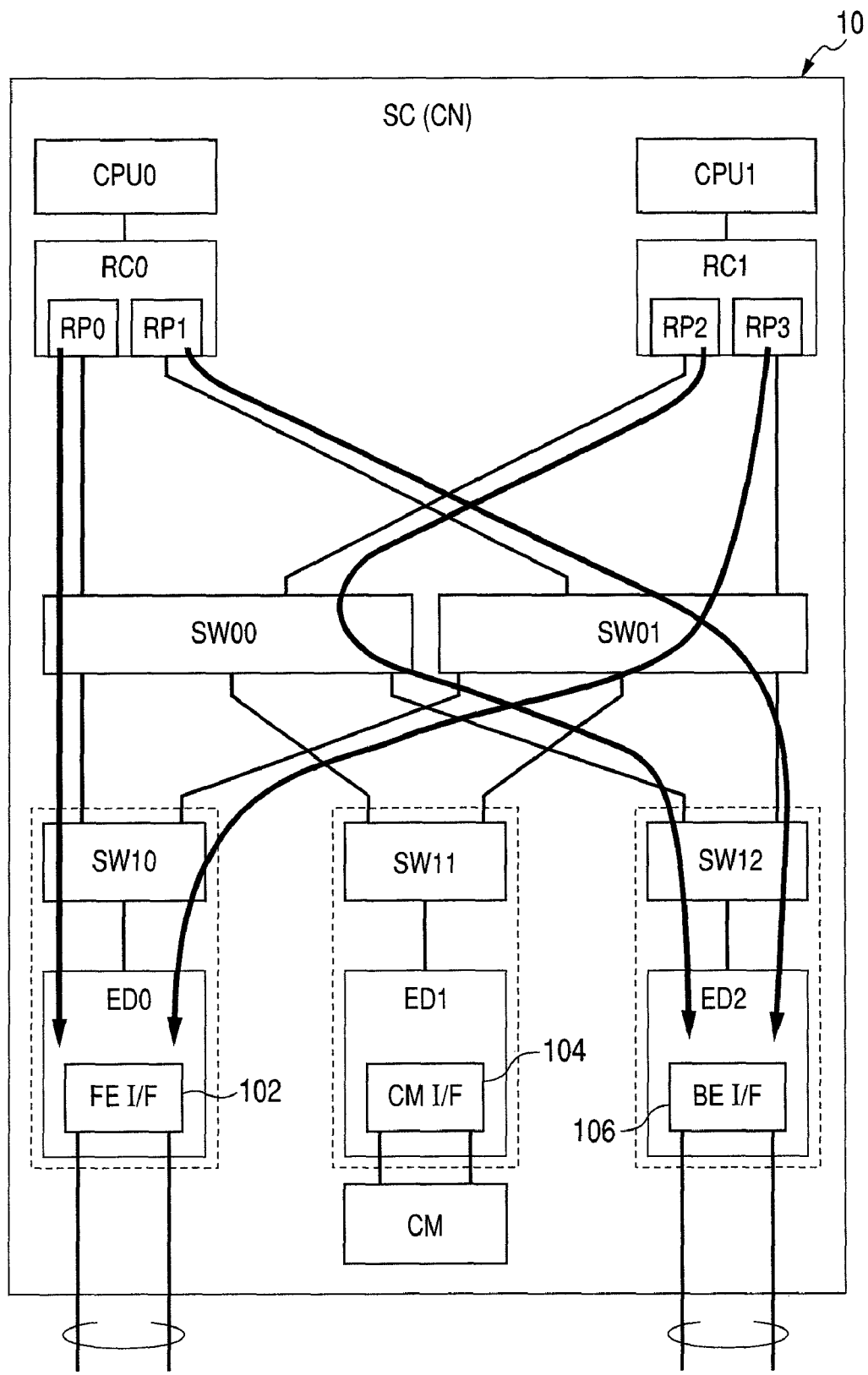
FIG. 28 is an explanatory drawing of an example of use (third mode) of the storage device of one embodiment.

FIG. 28 shows an example of data paths employed during VF mapping shown in FIG. 19 and FIG. 20 (path to the ED1 is omitted).

The data path change such as the change shown in FIGS. 13 to 20 can be executed in the same manner as the failover of the failed data path not only when a failure has occurred, but also with respect to a data path in which no failure has occurred.

Embodiment 2

Embodiment 2 will be described below with reference to FIG. 21 and figures with larger numbers. The configuration of Embodiment 2 is obtained by adding a function (VF state transition means) to the configuration of Embodiment 1.

<VF State Transition Means>

The alternative means (VF state transition means) for the VF state transition performed with the SR-PCIM will be explained below. The MR-PCIM executes the VF migration, but part of VF state transition, which is necessary for the VF migration, is executed by the SR-PCIM. However, when a failure occurs in a data path, communication between the SR-PCIM and VF appears to be difficult. As a result, in Embodiment 2, VF state transition means that causes a state transition of VF is provided instead of the SR-PCIM.

Figure 21:
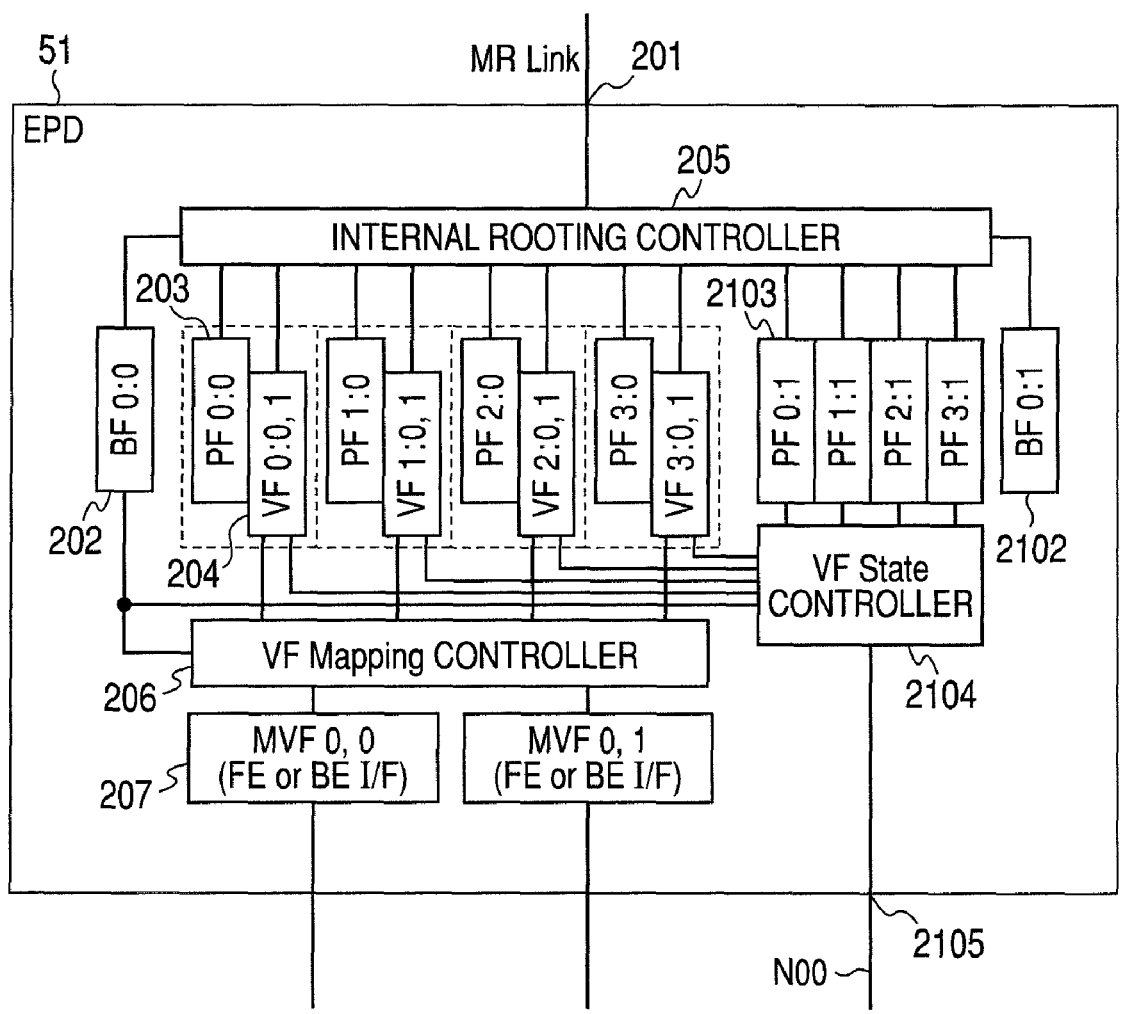
FIG. 21 shows a block configuration of an endpoint device in the storage device of Embodiment 2 of the present invention.

FIG. 21 shows a block configuration of an EPD 51 (for example, ED0) that, instead of the SR-PCIM, can cause the state transition of VFs. The EPD 51 is obtained by adding one BF 2102 ("BF 0:1") with a function number of 1 to the configuration of EPD 50 (ED0) shown in FIG. 2. The function number 1 after the BF 2102 ("BF 0:1") column indicates the use for state control of VFs. The EPD 51 is further provided with four PF 2103 ("PF 0:1", "PF 1:1", "PF 2:1", "PF 3:1") associated with the BF 2102. Further, a VF state controller 2104 is added. The VF state controller 2104 is connected to the PF 2103, VF 204, and management port 2105. The VF state controller 2104 can cause the state transition of four VF 204 ("VF 0:0, 1", "VF 1:0, 1", VF 2:0, 1", "VF 3:0, 1") with a function number of 0.

The BF 2102 and PF 2103 are functions that can control the transition state of VFs related to VF 204 and the like. The BF 2102 manages the characteristics of EPD 51 relating to functions with a function number of 1, according to the MR-IOV specification. The PF 2103 is provided for each VH to enable the access from each RP and connected to the VF state controller 2104. Each RP can communicate with the VF state controller 2104 via the PF with a function number of 1 allocated to each VH.

In Embodiment 2, the following three methods (configurations) are provided for VF state transition and control using the EPD 51. These configurations can be used selectively based on settings and the like. A configuration provided with any one method may be also employed.

First Method (method based on in-band communication): the VF state controller 2104 can cause, by connection to the PF 2103, the state transition of the VF 204 ("VF 0:0, 1", "VF 1:0, 1", "VF 2:0, 1", "VF 3:0, 1") by a command from a program (for example, FP 110 executed by the processor 21 on an RP in a data path that is normally connected to the EPD 51) operating within the SC 20.

When a VF within the EPD 51 cannot be accessed by the SR-PCIM within a certain VH (RP), the VF state controller 2104 within the EPD 51 is accessed via a PF with a function number of 1 in another VH (RP) that is normally accessible. For example, the ED0 is accessed from the RP1 rather than from the RP0 (PF 2103 ("PF 1:1") is used). In the case of configuration employing only the first method, the management port 2105 is unnecessary.

Second Method (method based on outbound communication): further, the VF state controller 2104 can receive, by connection to the SVP 190 via the management port 2105 and network N00, a command based on out-band communication from a program operating outside the PCIe fabric and can cause the state transition of VF 204 ("VF 0:0, 1", "VF 1:0, 1", "VF 2:0, 1", "VF 3:0, 1"). In the case of configuration provided only with the second method, the BF 2102 and PF 2103 are unnecessary.

Third Method (method based on autonomous function): furthermore, the VF state controller 2104 can cause the state transition of VF 204 ("VF 0:0, 1", "VF 1:0, 1", "VF 2:0, 1", "VF 3:0, 1") by an autonomous function (function that by itself performs determination and control relating to the VF state transition). In this case, the VF state controller 2104 connected to the BF 202 ("BF 0:0") updates the VF mapping management table within the BF 202 ("BF 0:0"). In the case of configuration provided only with the third method, the management port 2105 becomes unnecessary.

As described hereinabove, the VF state controller 2104 has three methods relating to state control of VFs with a function number of 0, and which method to use selectively can be set, for example, by the administrator in advance for each EPD 51 via the management port 2105.

<VF Migration Processing (1)>

Figure 22A:
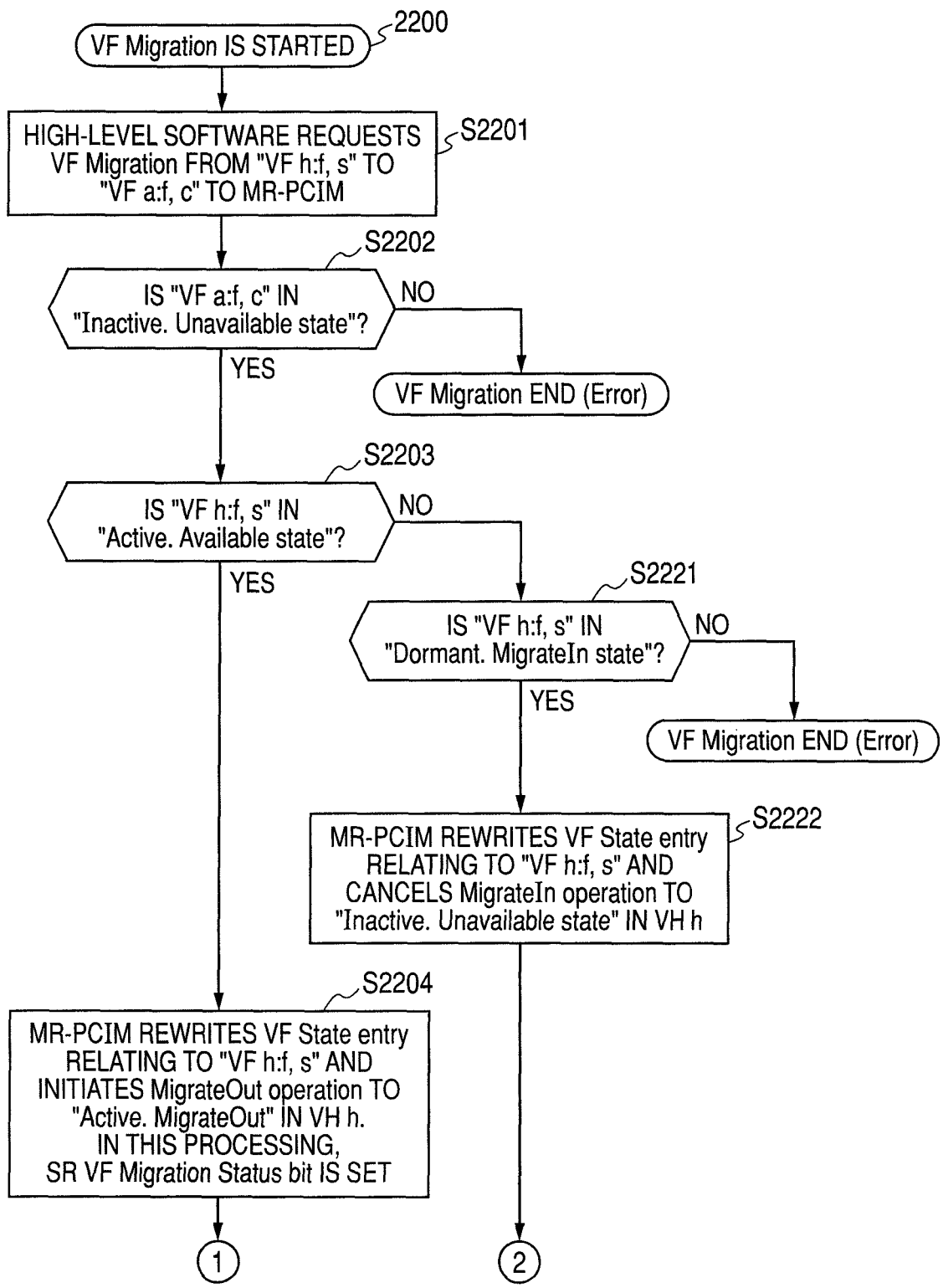
FIG. 22A is a flowchart illustrating a VF migration processing (first mode) in the first method in Embodiment 2.
Figure 22B:
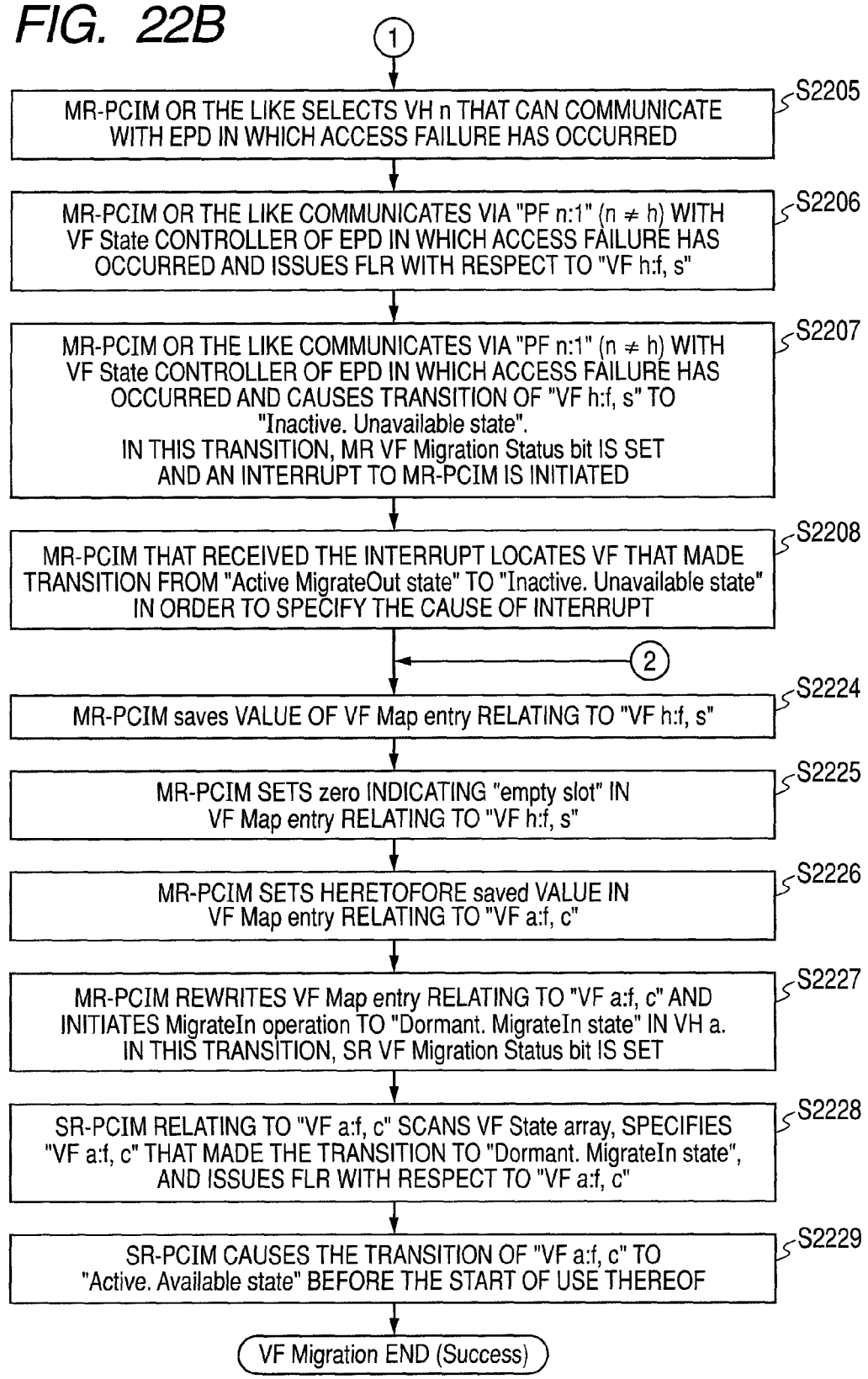
FIG. 22B is a flowchart illustrating a VF migration processing (second mode) in the first method in Embodiment 2.

FIGS. 22A, 22B show a flowchart of processing (2200) of causing the state transition of VFs with a function number of 0 by using a function with a function number of 1 and executing the VF migration in the EPD 51 by employing the first method.

In S2201, high-level software such as the FP 110 in Embodiment 2 requests the MR-PCIM to perform the VF migration from "VF h:f, s", which is the VF within the EPD 51 where an access failure has occurred, to "VF a:f, c".

The necessary condition for executing the VF migration is that the state of VF of the transition target be "Inactive. Unavailable state (I. U)" and that the state of VF of transition source be "Active. Available state (A. A)" or "Dormant. MigrateIn state (D. M)".

In S2202, the MR-PCIM determines whether the VF "VF a:f, c" of transition target is "I. U". If "Yes", the processing flow advances to S2203. If No, the necessary condition for VF migration is not satisfied and the processing is error ended.

In S2203, the MR-PCIM determines whether the VF "VF h:f, s" of transition source is "A. A". If "Yes", the processing flow advances to S2204. If "No", the processing flow advances to S2221.

In S2204, the MR-PCIM causes the transition of the VF state of "VF h:f, s", which is the VF within the EPD 51 where an access failure has occurred, from "A. A" to "A. M" by rewriting a VF state entry (the same value as the entry of the "VF State" (c) of the VF mapping management table (MigrateOut operation to "A. M" is initiated in "VH h"). In this transition the SR VF Migration Status bit is set (continuation to S2205 shown in FIG. 22B). This operation corresponds to (1) in FIG. 25.

In S2205 in FIG. 22B, the MR-PCIM and the like (MR-PCIM or software (FP 110 and the like) that can communicate with the MR-PCIM) selects "VH n" (n≠h), which is a VH that can communicate with the EPD 51 in which an access failure has occurred.

In S2206, the MR-PCIM or the like communicates via the PF 2103 "PF n:1" with the VF state controller 2104 within the EPD 51 in which an access failure has occurred and make the VF state controller 2104 to issue an FLR (Function Level Reset) to VF "VF h:f, s". This operation corresponds to (2) in FIG. 25.

In S2207, the MR-PCIM and the like communicates via the PF 2103 "PF n:1" (n≠h) with the VF state controller 2104 of the EPD 51 in which an access failure has occurred and causes the transition of the VF state of VF "VF h:f, s" from "A. M" to "I. U". In this transition, the MR VF Migration Status bit is set and an interrupt to the MR-PCIM is initiated. This operation corresponds to (3) in FIG. 25.

In S2208, the MR-PCIM that received the interrupt scans the VF mapping management table of the EPD 51 in which an access failure has been generated and locates the VF ("VF h:f, s") in which the transition has been made from "A. M" to "I. U" in order to specify the interrupt cause. This operation corresponds to (4) in FIG. 25.

In S2224, the MR-PCIM saves the value of the VF Map entry related to VF "VF h:f, s". This operation corresponds to (5) in FIG. 25. In S2225, the MR-PCIM sets 0 (zero) indicating "empty slot" to VF Map entry related to VF "VF h:f, s". This operation corresponds to (6) in FIG. 25. In S2226, the MR-PCIM sets the value saved in S2224 in the VF Map entry related to VF "VF a:f, c". This operation corresponds to (7) in FIG. 25.

In S2227, the MR-PCIM initiates the MigrateIn operation from "I. U" to "D. M" for VF "VF a:f, c" ("VH a" by rewriting the VF Map entry related to VF "VF a:f, c". In this transition, an SR VF Migration bit is set. This operation corresponds to (8) in FIG. 25.

In S2228, the SR-PCIM operating within "VH a" related to the VF "VF a:f, c" scans the VF state array, specifies the VF "VF a:f, c" that has made a transition to "D. M" and issues an FLR to this VF "VF a:f, c". This operation corresponds to (9) in FIG. 25.

In S2229, the SR-PCIM operating in "VH a" causes the transition of the VF state of VF "VF a:f, c" from "D. M" to "A. A" before the use of VF "VF a:f, c" is started. As a result, the VF transition is completed normally. This operation corresponds to (10) in FIG. 25.

In S2221 in FIG. 22A, it is determined whether the VF "VF h:f, s" of transition source is "D. M". If "Yes", the processing flow advances to S2222. If "No", the processing ends because the necessary condition of VF migration is not satisfied.

In S2222, the MR-PCIM rewrites the VF State entry related to the VF "VF h:f, s" and cancels the MigrateIn operation of VF "VF h:f, s". As a result, the VF "VF h:f, s" makes a transition from "D. M" to "I. U" (the processing flow then continues to S2224 shown in FIG. 23B). This operation corresponds to (11) in FIG. 25.

In the processing equivalent to S2205-S2207 in the MR-IOV specification, first, the SR-PCIM operating in the "VH h", which is the VH related to the VF "VF h:f, s" scans the VF State array, specifies the VF "VF h:f, s" that has made a transition to "A. M", interrupts the use of VF "VF h:f, s", and issues an FLR with respect to the VF "VF h:f, s". Then, the SR-PCIM causes the transition of the VF state of VF "VF h:f, s" from "A. M" to "I. U", sets the MR VF Migration Status bit in this transition and initiates an interrupt to the MR-PCIM.

As described above, a feature of the VF migration processing and failover method of Embodiment 2 (first method) is that steps that have to be processed by the SR-PCIM in the MR-IOV specification in S2205-S2207 are processed using the VF state controller 2104 provided within the EPD 51.

<VF Migration Processing (2)>

FIG. 23 shows a flowchart of processing (2300) in which the second method is used, the MR-PCIM employs out-band communication via the management port 2105 and network N00 in the EPD 51, causes the state transition of VF with a function number of 0 by the function with a function number of 1, and executes the VF migration.

In the second method, the initial steps are identical to the processing of S2201-S2204 shown in FIG. 22A, but subsequent processing includes S2305, S2306 shown in FIG. 23 as portions that are different from those of the first method.

In S2305, the MR-PCIM or the like (MR-PCIM, or software (failover control program and the like) that can communicate with the MR-PCIM)) performs the out-band communication via the network N00 with the VF state controller 2104 within the EPD 51 in which an access failure has occurred and issues an FLR relating to the VF ("VF h:f, s") to the VF state controller 2104.

In S2306, the MR-PCIM or the like performs the out-band communication via the network N00 with the VF state controller 2104 of the EPD 51 in which an access failure has occurred and causes the transition of the VF state of VF ("VF h: f, s") from "A. M" to "I. U". In this transition, the MR VF Migration status bit is set and an interrupt is issued to the MR-PCIM. Subsequent processing is the same as described above.

As described above, a feature of the VF migration processing and failover method of Embodiment 2 (second method) is that steps that have to be processed by the SR-PCIM in the MR-IOV specification in S2305-S2306 are processed using the VF state controller 2104 provided within the EPD 51 and the out-band communication.

<VF Migration Processing (3)>

Figure 24:
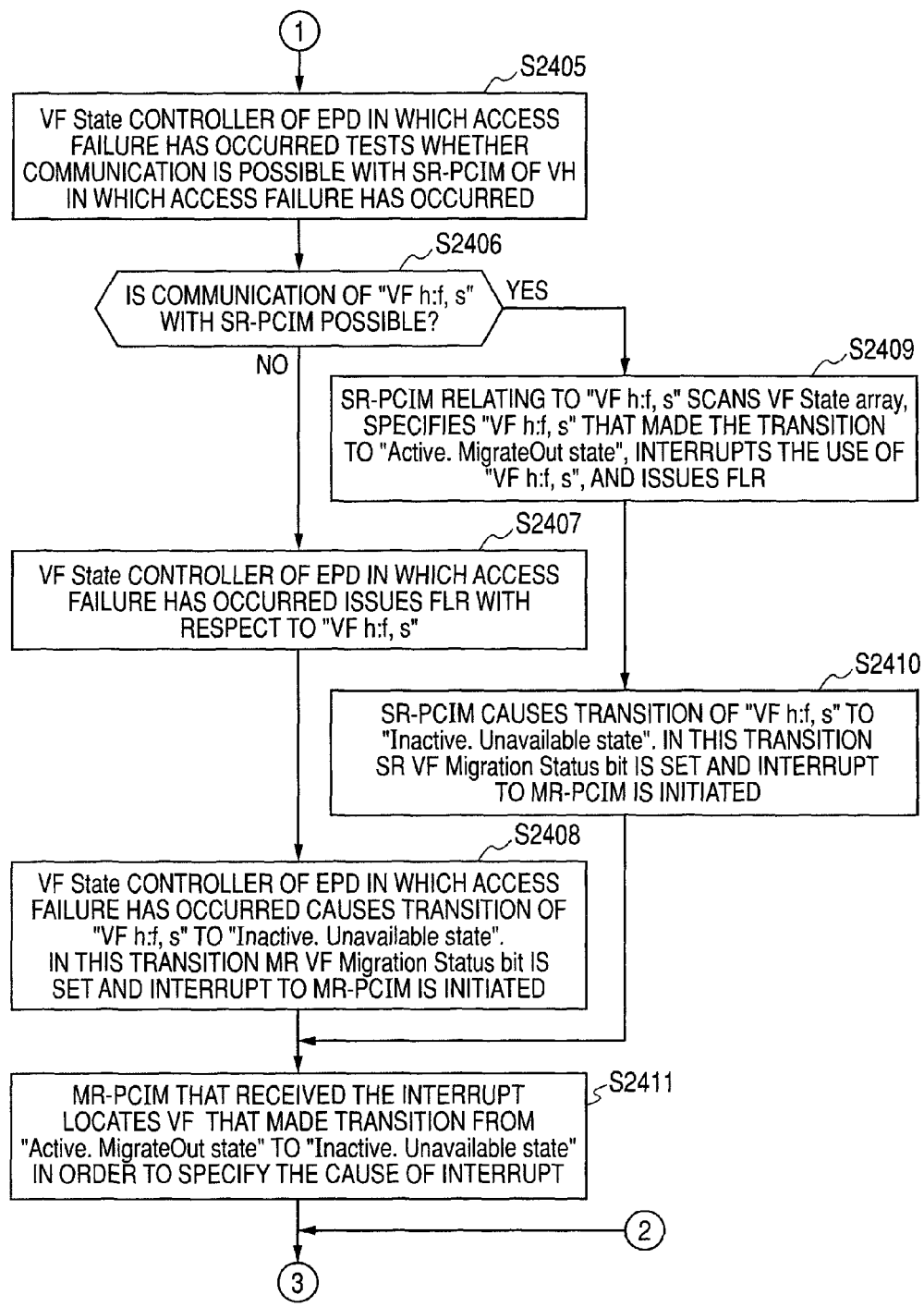
FIG. 24 is a flowchart illustrating a VF migration processing in the third method in Embodiment 2.

FIG. 24 shows a flowchart of processing (2400) in which the third method is used, an autonomous control function of the VF state controller 2104 causes the state transition of a VF with a function number of 0 in the EPD 51 and executes the VF migration.

In the third method, the initial steps are identical to the processing of S2201-S2204 shown in FIG. 22A. Furthermore, S2221-S2222 are identical to the processing of S2224-S2229 of FIG. 22B, but subsequent processing includes S2405-S2410 shown in FIG. 24 as portions that are different from those of the first method.

In S2405, the VF state controller 2104 of the EPD 51 in which an access failure has occurred verifies whether communication is possible with the SR-PCIM of VH in which the access failure has occurred. For example, when a failure occurs on a data path for accessing a VF (VF 3:0, 1) within an endpoint device from the RP3, the VF state controller 2104 controls the PF (PF 3, 1) with a function number of 1 that belongs to the same VH as the VF (VF 3:0, 1). The VF state controller 2104 implements an access test from the PF (PF 3, 1) to the RP3 that uses a physical data path identical to that for accessing the VF (VF 3:0, 1) from the RP3. The results obtained are used to determine whether the SR-PCIM operating within the VH3 can communicate with the VF (VF 3:0, 1).

In S2406, it is determined whether the EPD 51 in which an access failure has occurred can communicate with the SR-PCIM within the failed VH. Where the communication is possible, the processing flow advances to S2409. Where the communication is impossible, the processing flow advances to S2407.

In S2407, the VF state controller 2104 of the EPD 51 in which an access failure has occurred issues an FLR with respect to the VF "VF h:f, s" that has made the transition to "A. M".

In S2408, the VF state controller 2104 of EPD 51 in which an access failure has occurred causes the transition of VF "VF h:f, s" from "A. M" to "I. U". In this transition, the MR VF Migration Status bit is set and an interrupt to the MR-PCIM is initiated.

In S2409, the SR-PCIM operating in the "VH h" related to VF "VF h:f, s" scans the VF state array, specifies the VF "VF h:f, s" that has made a transition to "A. M", interrupts the use of this VF "VF h:f, s", and issues an FLR to this VF "VF h:f, s".

In S2410, the SR-PCIM causes the transition of VF "VF h:f, s" from "A. M" to "I. U". In this transition, the MR VF Migration Status bit is set and an interrupt to the MR-PCIM is initiated.

In S2411, the MR-PCIM that received the interrupt locates the VF ("VF h:f, s") in which a transition has been made from "A. M" to "I. U" in order to specify the interrupt cause. Subsequent processing is the same as described above.

As described above, a feature of the VF migration processing and failover method of Embodiment 2 (third method) is that steps that have to be processed by the SR-PCIM in the MR-IOV specification in S2405-S2410 are processed by autonomous control by the VF state controller 2104 provided within the EPD 51.

<State Transition of VF Migration>

Figure 25:
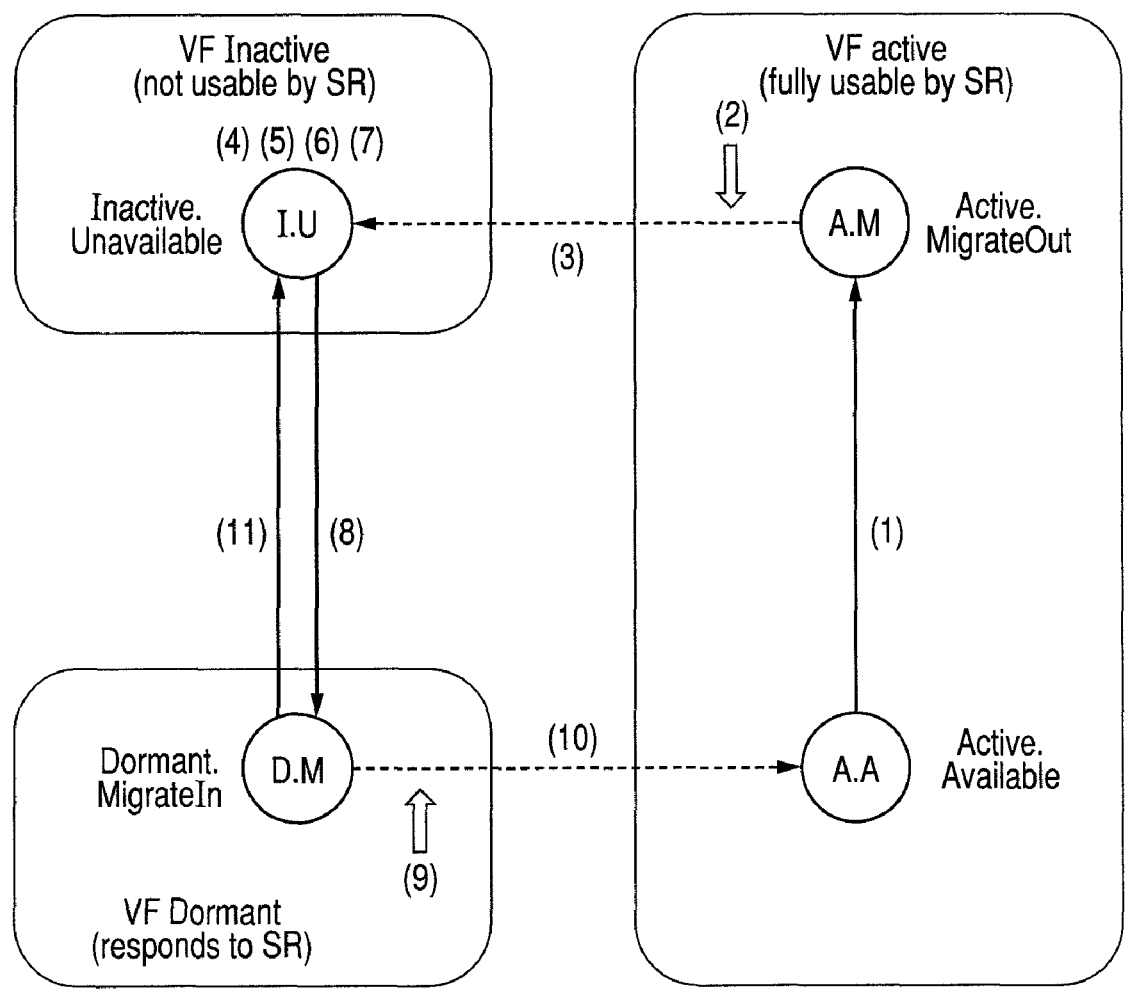
FIG. 25 is an explanatory drawing of a VF state transition following the VF migration based on the MR-IOV specification.

FIG. 25 illustrates, as a supplement, a state transition relating to VF migration based on the MR-IOV specification. The VF has four states ("A. A (Active. Available state)", "A. M (Active. MigrateOut state)", "I. U (Inactive. Unavailable state)", "D. M (Dormant. MigrateIn state"). Solid arrows in the figure show state transitions performed by the MR-PCIM. Broken arrows show state transitions performed by the SR-PCIM. "A. A", "A. M" are VF active (fully usable by SR), "I. U" is VF inactive (not usable by SR), and "D. M" is VF Dormant (responds to SR).

During the failover operation, as a VF state transition control that accompanies the VF migration, the control by the MR-PCIM in (1) causes the transition from "A. A" to "A. M" and the control by the SR-PCIM in (3) causes the transition from "A. M" to "I. U" However, there can be a case in which the control by the SR-PCIM (VF state transition control) is impossible during the transition from "A. M" to "I. U" in (3) because of data path failure or the like. Therefore, as described above, an alternative means of the VF state transition control is provided.

With the embodiments described hereinabove, in the storage device 10 in which the MR-IOV is applied to the internal network (CN) of the SC 20, the failover of a data path from an RP to an EPD can be executed by the operations of access source RP change in the data path and VF migration of the VF within the access target EPD by the MR-PCIM or the like. Therefore, in a system using the storage device 10, even when a failure occurs in a data path, a failover to another data path can be performed and high reliability can be ensured.

The present invention has been specifically described above based on embodiments thereof, but the present invention is not limited to the embodiments and various modifications may be made without departing from the spirit of the invention.

The present invention is suitable not only for storage devices having an internal network, but also can be widely applied to computers such as a blade-type server and internal network technology thereof.

What is claimed is:

1. A storage device including an internal network in which components located within a storage controller are connected by PCI Express, wherein the storage controller and the internal network thereof comprise:

one or more root complexes that have a plurality of root ports as a whole, each root complex including one or more root ports;

one or more processors connected to each root complex;

a plurality of virtual hierarchies, which include a first virtual hierarchy and a second virtual hierarchy corresponding to each of the root ports;

a plurality of endpoint devices which include a front-end interface endpoint device for connecting to a host device, a back-end interface endpoint device for connecting to a group of storage devices, and a cache memory interface endpoint device for connecting to a cache memory; and a switch that connects the plurality of root ports and the plurality of endpoint devices, and that configures data paths between the root ports and the endpoint devices;

wherein:

the front-end interface endpoint device has functions, one of which is in an active state in the first virtual hierarchy and another of which is in an inactive state in the second virtual hierarchy;

the back-end interface endpoint device has functions, one of which is in an active state in the second virtual hierarchy and another of which is in an inactive state in the first virtual hierarchy;

the state of the functions which the front-end interface endpoint device and the back-end interface endpoint device have is changeable between active state and inactive state;

the cache memory interface endpoint device has functions, one of which is in an active state in the first virtual hierarchy and another of which is in an active state in the second virtual hierarchy; and the storage controller and the internal network transfer data in the first and second virtual hierarchies in a normal state;

and further wherein, when a failure occurs in one of the data paths from one of the plurality of root ports to one of the functions which at least one of the endpoint devices has via the switch in the first virtual hierarchy, the storage controller and the internal network thereof perform a processing of switching an access source root port of the data path, a processing of changing the function belonging to the first virtual hierarchy to the inactive state in the front-end interface endpoint device and the function belonging to the second virtual hierarchy to the active state in the back-end interface endpoint device, and a processing of transferring a data in the second virtual hierarchy, as a processing for executing a data path failover, or when a failure occurs in one data path from one of the plurality of root ports to one of the functions which at least one of the endpoint devices has via the switch in the second virtual hierarchy, the storage controller and the internal network thereof perform a processing of switching an access source root port of the data path, a processing of changing the function belonging to the second virtual hierarchy to the inactive state in the back-end interface endpoint device and the function belonging to the first virtual hierarchy to the active state in the front-end interface endpoint device, and a processing of transferring a data in the first virtual hierarchy, as a processing for executing a data path failover.

2. The storage device according to claim 1, wherein the storage controller and the internal network thereof includes a failover management table,
wherein when a failure occurs in one data path from one of the plurality of root ports to one of the functions which at least one of the endpoint devices has, the failover management table stores information of one or more alternative functions which are available and information of one or more functions which are not available corresponding to each of said root ports.

3. The storage device according to claim 2,
wherein the failover management table includes information regarding a data path in which a failure can simultaneously occur when a failure has occurred in another data path.

4. The storage device according to claim 2, when a change has occurred in the data stored within the failover management table, the cache memory interface endpoint device which has the failover management table sends an interrupt to the root ports, and changes one data path for accessing to the endpoint devices.

5. A method of operating a storage device including an internal network in which components located within a storage controller are connected by PCI Express, wherein the storage controller and the internal network thereof comprise:
one or more root complexes that have a plurality of root ports as a whole, each root complex including one or more root ports;
one or more processors connected to each root complex;
a plurality of virtual hierarchies, which include a first virtual hierarchy and a second virtual hierarchy corresponding to each of the root ports;
a plurality of endpoint devices which include a front-end interface endpoint device for connecting to a host device, a back-end interface endpoint device for connecting to a group of storage devices, and a cache memory interface endpoint device for connecting to a cache memory; and
a switch that connects the plurality of root ports and the plurality of endpoint devices, and that configures data paths between the root ports and the endpoint devices;
wherein:
the front-end interface endpoint device has functions, one of which is in an active state in the first virtual hierarchy and another of which is in an inactive state in the second virtual hierarchy;
the back-end interface endpoint device has functions, one of which is in an active state in the second virtual hierarchy and another of which is in an inactive state in the first virtual hierarchy;
the state of the functions which the front-end interface endpoint device and the back-end interface endpoint device have is changeable between active state and inactive state;
the cache memory interface endpoint device has functions, one of which is in an active state in the first virtual hierarchy and another of which is in an inactive state in the second virtual hierarchy; and
the storage controller and the internal network transfer data in the first and second virtual hierarchies in a normal state, said method comprising:
when a failure occurs in one of the data paths from one of the plurality of root ports to one of the functions which at least one of the endpoint devices has via the switch in the first virtual hierarchy, the storage controller and the internal network thereof perform a processing of switching an access source root port of the data path, a processing of changing the function belonging to the first virtual hierarchy to the inactive state in the front-end interface endpoint device and the function belonging to the second virtual hierarchy to the active state in the back-end interface endpoint device, and a processing of transferring a data in the second virtual hierarchy, as a processing for executing a data path failover, or when a failure occurs in one data path from one of the plurality of root ports to one of the functions which at least one of the endpoint devices has via the switch in the second virtual hierarchy, the storage controller and the internal network thereof perform a processing of switching an access source root port of the data path, a processing of changing the function belonging to the second virtual hierarchy to the inactive state in the back-end interface endpoint device and the function belonging to the first virtual hierarchy to the active state in the front-end interface endpoint device, and a processing of transferring a data in the first virtual hierarchy, as a processing for executing a data path failover.

6. The method according to claim 5, wherein the storage controller and the internal network thereof includes a failover management table, wherein said method further comprises:
wherein when a failure occurs in one data path from one of the plurality of root ports to one of the functions which at least one of the endpoint devices has, the failover management table stores information of one or more alternative functions which are available and information of one or more functions which are not available corresponding to each of said root ports.

7. The method according to claim 6,
wherein the failover management table includes information regarding a data path in which a failure can simultaneously occur when a failure has occurred in another data path.

8. The method according to claim 6, wherein said method further comprises:
when a change has occurred in the data stored within the failover management table, the cache memory interface endpoint device which has the failover management table sends an interrupt to the root ports, and changes one data path for accessing to the endpoint devices.

* * * * *